United States Patent
Uemura et al.

(10) Patent No.: US 10,631,221 B2
(45) Date of Patent: Apr. 21, 2020

(54) DIRECT COMMUNICATION BY USE OF FREQUENCY OF NEIGHBORING CELL

(71) Applicant: Sharp Kabushiki Kaisha, Sakai, Osaka (JP)

(72) Inventors: Katsunari Uemura, Sakai (JP); Hidekazu Tsuboi, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 15/324,285

(22) PCT Filed: Jul. 3, 2015

(86) PCT No.: PCT/JP2015/069343
§ 371 (c)(1),
(2) Date: Jan. 6, 2017

(87) PCT Pub. No.: WO2016/006560
PCT Pub. Date: Jan. 14, 2016

(65) Prior Publication Data
US 2018/0184348 A1 Jun. 28, 2018

(30) Foreign Application Priority Data
Jul. 8, 2014 (JP) .................................. 2014-140102

(51) Int. Cl.
*H04W 36/26* (2009.01)
*H04W 4/70* (2018.01)
(Continued)

(52) U.S. Cl.
CPC ............ *H04W 36/26* (2013.01); *H04W 4/70* (2018.02); *H04W 36/08* (2013.01); *H04W 48/16* (2013.01);
(Continued)

(58) Field of Classification Search
CPC ...... H04W 36/26; H04W 36/08; H04W 72/02; H04W 72/0433; H04W 92/18;
(Continued)

(56) References Cited

U.S. PATENT DOCUMENTS 9,155,036 B1* 10/2015 Singh ................... H04W 48/20
10,419,990 B2* 9/2019 Uemura ................ H04W 48/12
(Continued)

FOREIGN PATENT DOCUMENTS

| JP | 2007-502573 A | 2/2007 |
| WO | 2013/055271 A1 | 4/2013 |
| WO | 2016/022214 A1 | 2/2016 |

OTHER PUBLICATIONS

Official Communication issued in International Patent Application No. PCT/JP2015/069343, dated Sep. 15, 2015.
(Continued)

*Primary Examiner* — Warner Wong
(74) *Attorney, Agent, or Firm* — Keating & Bennett, LLP

(57) ABSTRACT

Provided is a technology relating to a terminal device, a base station apparatus, a communication system, a communication method, and an integrated circuit, in all of which it is possible that a communication procedure relating to device-to-device communication is efficiently performed. A terminal device that is capable of direct communication with a different terminal device makes a determination of whether or not transmission and reception of data relating to the direct communication at a frequency in a serving cell are not possible and transmission and reception of data relating to the direct communication at a frequency in a neighboring cell are possible, based on capability information relating to a combination of frequency bands that are supported by the terminal device, the frequency in the serving cell, and the frequency in the neighboring cell, and starts evaluation for selecting the neighboring cell, at a frequency in the neigh-
(Continued)

boring cell in which the transmission and reception of the data relating to the direct communication are possible, in a case where the terminal device is interested in the direct communication.

5 Claims, 8 Drawing Sheets

(51) Int. Cl.
| | |
|---|---|
| H04W 72/04 | (2009.01) |
| H04W 92/18 | (2009.01) |
| H04W 48/16 | (2009.01) |
| H04W 48/20 | (2009.01) |
| H04W 36/08 | (2009.01) |
| H04W 72/02 | (2009.01) |
| H04W 48/12 | (2009.01) |
| H04W 76/14 | (2018.01) |
| H04W 76/23 | (2018.01) |

(52) U.S. Cl.
CPC .......... *H04W 48/20* (2013.01); *H04W 72/02* (2013.01); *H04W 72/0453* (2013.01); *H04W 92/18* (2013.01); *H04W 48/12* (2013.01); *H04W 76/14* (2018.02); *H04W 76/23* (2018.02)

(58) Field of Classification Search
CPC ... H04W 76/14; H04W 76/23; H04W 28/029; H04W 28/0225; H04W 36/00; H04W 36/18; H04W 36/34; H04W 36/0083; H04L 29/06326; H04L 29/08306
See application file for complete search history.

(56) References Cited

U.S. PATENT DOCUMENTS

| | | | |
|---|---|---|---|
| 2005/0090278 A1 | 4/2005 | Jeong et al. | |
| 2007/0054666 A1* | 3/2007 | Choi | H04W 60/00 455/434 |
| 2008/0242308 A1* | 10/2008 | Gunnarsson | H04W 72/0486 455/450 |
| 2012/0176892 A1* | 7/2012 | Yamamoto | H04W 36/30 370/221 |
| 2013/0059583 A1* | 3/2013 | Van Phan | H04W 72/04 455/435.1 |
| 2013/0102314 A1* | 4/2013 | Koskela | H04W 36/0072 455/436 |
| 2013/0115989 A1* | 5/2013 | Yamazaki | H04W 16/08 455/507 |
| 2013/0130682 A1* | 5/2013 | Awad | H04W 48/20 455/434 |
| 2013/0196664 A1* | 8/2013 | Yiu | H04W 4/70 455/436 |
| 2013/0303231 A1* | 11/2013 | Yiu | H04B 7/0647 455/525 |
| 2013/0324133 A1* | 12/2013 | Li | H04W 36/20 455/444 |
| 2014/0188271 A1* | 7/2014 | Hernandez | B67D 1/0888 700/232 |
| 2014/0315562 A1* | 10/2014 | Lim | H04W 8/005 455/450 |
| 2015/0141000 A1* | 5/2015 | Yilmaz | H04W 36/0094 455/426.1 |
| 2015/0208308 A1* | 7/2015 | Watanabe | H04W 36/08 455/436 |
| 2015/0230217 A1* | 8/2015 | Yu | H04W 72/02 370/330 |
| 2015/0319738 A1* | 11/2015 | Fodor | H04W 24/10 370/330 |
| 2015/0373601 A1* | 12/2015 | Benjebbour | H04W 72/082 370/252 |
| 2016/0044552 A1* | 2/2016 | Heo | H04W 4/008 370/331 |
| 2016/0353397 A1* | 12/2016 | Jung | H04W 56/001 |
| 2017/0006582 A1* | 1/2017 | Jung | H04W 72/02 |
| 2017/0006585 A1* | 1/2017 | Jung | H04W 72/042 |
| 2017/0019796 A1* | 1/2017 | Jung | H04W 76/14 |
| 2017/0048647 A1* | 2/2017 | Jung | H04W 76/14 |
| 2017/0150410 A1* | 5/2017 | Yang | H04W 36/04 |
| 2017/0195905 A1* | 7/2017 | Jung | H04W 24/08 |
| 2017/0195946 A1* | 7/2017 | Jung | H04W 48/08 |
| 2017/0245233 A1* | 8/2017 | Jung | H04W 56/00 |
| 2018/0199181 A1* | 7/2018 | Jung | H04W 72/02 |

OTHER PUBLICATIONS

"3rd Generation Partnership Project; Technical Specification Group Radio Access Network; Study on LTE Device to Device Proximity Services; Radio Aspects (Release 12)", 3GPP TR 36.843, V12.0.1, Mar. 2014, pp. 1-50.

"3rd Generation Partnership Project; Technical Specification Group Radio Access Network; Evolved Universal Terrestrial Radio Access (E-UTRA); User Equipment (UE) procedures in idle mode (Release 12)", 3GPP TS 36.304, V12.0.0, Mar. 2014, pp. 1-34.

LG Electronics Inc., "Prioritized reselection of D2D supported frequency", 3GPP TSG-RAN WG2 #86, R2-142631, May 19-23, 2014, pp. 1-3.

Kyocera; "Inter-frequency discovery considerations"; 3GPP TSG-RAN WG2 #86; R2-142240; May 19-23, 2014; 10 pages.

3rd Generation Partnership Project; Technical Specification Group Radio Access Network; "User Equipment (UE) procedures in idle mode and procedures for cell reselection in connected mode (Release 12)" 3GPP TS 25.304; V12.2.0; Jun. 2014; 12 pages.

* cited by examiner

DIRECT COMMUNICATION BY USE OF FREQUENCY OF NEIGHBORING CELL

TECHNICAL FIELD

The present invention relates to a terminal device, a base station apparatus, a communication system, a communication method, and an integrated circuit, in all of which it is possible that a communication procedure relating to device-to-device communication is efficiently performed.

This application claims the benefit of Japanese Priority Patent Application No. 2014-140102 filed on Jul. 8, 2014, the entire contents of which are incorporated herein by reference.

BACKGROUND ART

In the 3rd Generation Partnership Project (3GPP) that is a standardization project, a standardization process for Evolved Universal Terrestrial Radio Access (EUTRA) that realizes high-speed communication has been performed by employing flexible scheduling in prescribed frequency and time units, which is referred to as an Orthogonal Frequency-Division Multiplexing (OFDM) communication scheme or a resource block. In some cases, EUTRA is also referred to as Long Term Evolution (LTE).

Furthermore, in the 3GPP, discussions on LTE Advanced (which is also referred to as LTE-A) that realizes higher-speed data transfer and has upper compatibility with LTE have taken place.

In LTE Advanced, discussions on a technology that performs direct communication from a device apparatus (a terminal device) to a different device apparatus (a terminal device) have taken place. The direct communication from the device apparatus to a different device apparatus is referred to as Device-to-Device (D2D) or inter-device communication. Moreover, the D2D that is standardized in 3GPP is also referred to particularly as LTE-D2D or LTE-Direct.

In order to realize as a service (Proximity-based Services (ProSe)) between terminal devices in proximity in the D2D, discussions on a method for discovering a terminal device in proximity, a method for enabling terminal devices to performs direct communication, and the like have taken place in the 3GPP (NPL 1).

Furthermore, NPL 2 discloses a method and the like in which only in a case where the terminal device in an idle state, which is interested in Multimedia Broadcast and Multicast Service (MBMS), camps at a frequency at which a service (an MBMS service) relating to the MBMS is provided, if reception of the service relating to the MBMS is possible, by raising in a cell re-selection procedure a priority level of the frequency at which the service relating to the MBMS is provided to the maximum extent, the service relating to the MBMS is made to continue to be available.

Furthermore, NPL 3 discloses a method and the like in which by using the same technology as in NPL 2, the terminal device in the idle state, which is interested in the D2D, raises the priority level of the frequency (the frequency at which it is possible that the service for the D2D is provided) at which transmission and reception of the D2D are possible in the cell reselection procedure, to the maximum extent, and thus transmission or reception of the service relating to the D2D is made possible.

CITATION LIST

Non-Patent Document

[Non-Patent Document 1] NPL 1: 3GPP TS 36.843 V12.0.1 (2014 March) http://www.3gpp.org/DynaReport/36843.htm
[Non-Patent Document 2] NPL 2: 3GPP TS 36.304 V12.0.0 (2014 March) http://www.3gpp.org/DynaReport/36304.htm
[Non-Patent Document 3] NPL 3: R2-142631, LG Electronics Inc., Korea, 19-23 May 2014. http://www.3gpp.org/ftp/tsg_ran/WG2_RL2/TSGR2_86/Docs/R2-142631.zip

DISCLOSURE OF THE INVENTION

Problems to be Solved by the Invention

By using the method in NPL 3, the terminal device in the idle state, which is interested in the D2D, can preferentially select a frequency at which transmission or reception of the D2D are possible, in a case where the terminal device is interested in the transmission or the reception of the service relating to the D2D. However, in a case where many terminal devices that are interested in the D2D are present, there is a problem in that the devices camp concentratedly at the frequency (in the cell) at which the transmission or the reception of the D2D is possible and that the capacity of the base station apparatus at the frequency (in the cell) is exceeded (overloaded).

Furthermore, because the D2D is performed using an uplink resource, particularly in the case of FDD, there is another problem in that a priority level is not configured for the frequency at which the transmission or the reception of the D2D is possible and the method of changing the priority level of the frequency in the related art is difficult to apply.

The present invention provides a technology relating a terminal device, a base station apparatus, a communication system, a communication method, and an integrated circuit, in all of which it is possible that a communication procedure relating to device-to-device communication is efficiently performed.

Means for Solving the Problems

According to an aspect of the present invention, there is provided a terminal device that is capable of direct communication with a different terminal device, which, in a case where the terminal device is interested in the direct communication, makes a determination of whether or not transmission and reception of data relating to the direct communication at a frequency in a serving cell are not possible and transmission and reception of data relating to the direct communication at a frequency in a neighboring cell is possible, starts evaluation for selecting the neighboring cell, at a frequency in the neighboring cell in which the transmission and reception of the data relating to the direct communication are possible, and makes the determination based on capability information relating to a combination of frequency bands that are supported by the terminal device, the frequency in the serving cell, and the frequency in the neighboring cell.

Furthermore, the terminal device according to the aspect of the present invention regards a priority level of the frequency in the neighboring cell in which the direct communication is supported, as the highest one, and performs evaluation of the neighboring cell.

Furthermore, the terminal device according to the aspect of the embodiment of the present invention performs the direct communication in the serving cell, in a case where the transmission and reception of the data relating to the direct communication at the frequency in the serving cell are possible.

By using this means, it is possible that the terminal device efficiently performs a communication procedure relating to the device-to-device communication.

Furthermore, according an aspect of the present invention, there is provided a communication method for use in a terminal device that is capable of direct communication with a different terminal device, the communication method including at least: a step of making a determination of whether or not transmission and reception of data relating to the direct communication at a frequency in a serving cell are not possible and transmission and reception of data relating to the direct communication at a frequency in a neighboring cell are possible; and a step of starting evaluation for selecting the neighboring cell, at a frequency in the neighboring cell in which the transmission and reception of the data relating to the direct communication are possible, in which the step of making the determination and the step of starting evaluation are performed in a case where the terminal device is interested in the direct communication, and in which the determination is made based on capability information relating to a combination of frequency bands that are supported by the terminal device, the frequency in the serving cell, and the frequency in the neighboring cell.

Furthermore, the communication method for use in the terminal device according to the aspect of the present invention further includes a step of regarding a priority level of the frequency in the neighboring cell in which the direct communication is supported, as the highest one, and of performing evaluation of the neighboring cell.

Furthermore, the communication method for use in the terminal device according to the aspect of the embodiment of the present invention, further includes a step of performing the direct communication in the serving cell, in a case where the transmission and reception of the data relating to the direct communication at the frequency in the serving cell are possible.

By using this means, it is possible that the terminal device is provided with the communication method of efficiently performing the communication procedure relating to the device-to-device communication.

Furthermore, according to an aspect of the present invention, there is provided an integrated circuit that is built into a terminal device that is capable of direct communication with a different terminal device, the integrated circuit causing the terminal device to perform at least one function among: a function of making a determination of whether or not transmission and reception of data relating to the direct communication at a frequency in a serving cell are not possible and transmission and reception of data relating to the direct communication at a frequency in a neighboring cell are possible; and a function of starting evaluation for selecting the neighboring cell, at a frequency in the neighboring cell in which the transmission and reception of the data relating to the direct communication are possible, in which the function of making the determination and the function of starting evaluation are performed in a case where the terminal device is interested in the direct communication.

By using this means, it is possible that the integrated circuit in the terminal device causes the terminal device to perform a function of efficiently executing the communication procedure relating to the device-to-device communication.

In the present specification, each embodiment is disclosed in terms of the technology associated with the terminal device, the base station apparatus, the communication system, the communication method, and the integrated circuit, in all of which the efficient communication procedure is executed, but a communication scheme that is applicable to each embodiment is not limited to a communication scheme that is used in EUTRA (LTE and LTE-A).

For example, the technology that is described in the present specification can be used in various communication systems, such as Code Division Multiple Access (CDMA), Time Division Multiple Access (TDMA), Frequency Division Multiplexing Access (FDMA), orthogonal FDMA (OFDMA), single career FDMA (SC-FDMA), and other access schemes. Furthermore, in the present specification, the system and the network can be used synonymously.

Effects of the Invention

According to embodiments of the present invention, a technology can be provided that is associated with a terminal device, a base station apparatus, a communication system, a communication method, and an integrated circuit, in all of which efficient communication procedure is executed.

MODE FOR CARRYING OUT THE INVENTION

Figure 1:
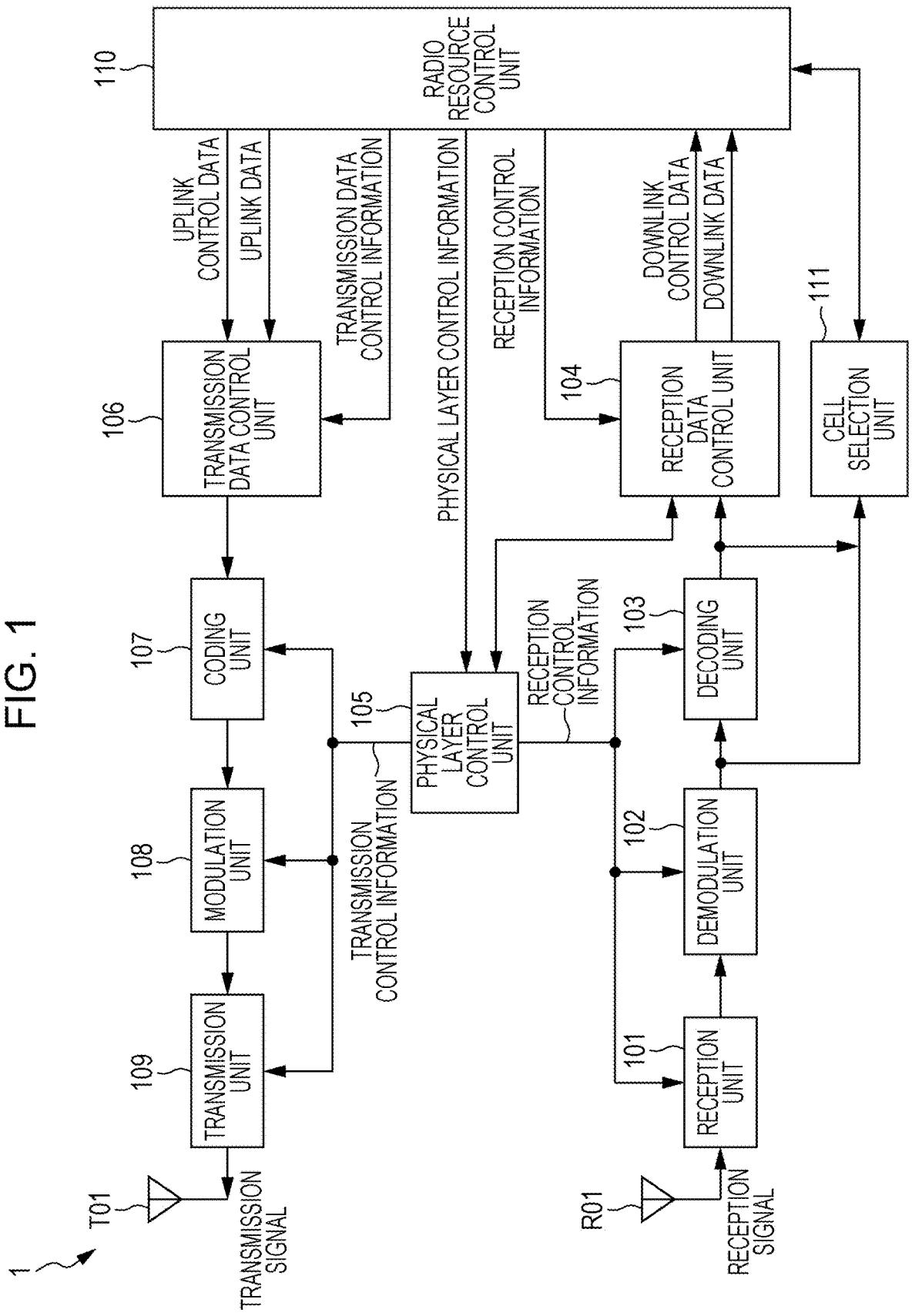
FIG. 1 is a block diagram illustrating an example of a schematic constitution of a terminal device according to an embodiment of the present invention.

A technology associated with each embodiment of the present invention will be described briefly below.

[Physical Channel/Physical Signal]

A main physical channel and a physical signal that are used in EUTRA (LTE and LTE-A) are described. A channel means a medium that is used for signal transmission and reception, and a physical channel means a physical medium that is used for the signal transmission and reception. According to the present invention, the physical channel and the signal can be used synonymously. There is a likelihood that in a communication system the results from developing EUTRA (LTE and LTE-A), a type of physical channel will be added or a structure or format type of the physical channel will be changed or added, but in such a case, the addition and change do not an influence on a description of each embodiment of the present invention.

In EUTRA, scheduling of the physical channel or the physical signal is managed using a radio frame. One radio frame is 10 ms, and one radio frame is constituted from 10 subframes. In addition, one subframe is constituted from two slots (that is, one subframe is 1 ms and one slot is 0.5 ms). Furthermore, management is performed using a resource block as a minimum unit for scheduling for allocating the physical channel. The resource block is stipulated with a fixed frequency domain that is constituted from a set of multiple subcarriers (for example, 12 subcarriers) along a frequency axis and by a domain that is constituted from a fixed transmission time interval (one slot).

A synchronization signal is constituted from 3 types of primary synchronization signals and a secondary synchronization signal that is constituted from 31 types of codes which are interleaved in the frequency domain. With a combination of these signals, the primary synchronization signal and the secondary synchronization signal, 504 cell identifiers (Physical Cell ID (Physical Cell Identity) (PCI)) for identifying a base station apparatus and a frame timing for wireless synchronization are indicated. A terminal device specifies a physical cell ID of the synchronization signal that is received through cell search.

A Physical Broadcast Channel (PBCH) is transmitted for the purpose of notifying (configuring) master control information that is used in a shared manner in terminal devices within a cell. The base station apparatus notifies (transmits) a master information block (MIB) message on the physical broadcast information channel Information that is notified to (configured for) the terminal device with the master information block message is physical channel (PHICH) configuration information relating to downlink frequency bandwidth, a system frame number, and a Hybrid ARQ.

The base station apparatus transmits cell shared information (broadcast information) other than a master information block with a system information block type 1 (SIB 1) message for which a subframe position and a periodicity are decided fixedly, and a system information message that is a Layer 3 message (RRC message). In a radio resource that is indicated with a Physical Downlink Control Channel, the system information message is notified using a Physical Downlink Shared Channel, and notifies each of the system information block type 2 to the system information block type n (SIB 2 to SIB n (n is a natural number)) according to its intended use.

As pieces of broadcast information, a Cell Global Identifier (CGI) indicating a cell-dedicated identifier, a Tracking Area Identifier (TAI) for managing a waiting area by paging, random access configuration information, transmission timing adjustment information, shared radio resource configuration information for every cell, neighboring cell information (Neighboring cell list) at an intra-frequency (an inter-frequency or an inter-RAT), uplink access limitation information, and the like are notified.

Downlink reference signals are categorized by their usage into multiple types. For example, a cell-specific reference signal (RS) is a pilot signal that is transmitted with a prescribed power for every cell, and is a downlink reference signal that is periodically iterated in the frequency domain and the time domain based on a prescribed rule. The terminal device measures reception quality for every cell by receiving the cell-specific RS. Furthermore, the terminal device uses the cell-specific RS also as a reference signal for demodulation of the Physical Downlink Control Channel that is transmitted together with the cell-specific RS, or of the Physical Downlink Shared Channel. As a sequence that is used for the cell-specific RS, a sequence that is identifiable for every cell is used.

Furthermore, the downlink reference signal is also used for estimation of propagation fluctuation in the downlink. The downlink reference signal that is used for the estimation of the propagation fluctuation is referred to as a Channel State Information Reference Signals (CSI-RS). Furthermore, the downlink reference signal that is configured, in a dedicated manner, for the terminal device is referred to as UE-specific Reference Signals (URS), Demodulation Reference Signal (DMRS), and is referred to for channel compensation processing of the channel that is to be performed when demodulating the Physical Downlink Control Channel, Enhanced Physical Downlink Control Channel, or the Physical Downlink Shared Channel.

The Physical Downlink Control Channel (PDCCH) is transmitted in several OFDM symbols (for example, 1 to 4 OFDM symbols) starting from the head of each subframe. The Enhanced Physical Downlink Control Channel (EPDCCH) is the Physical Downlink Control Channel that is allocated to the OFDM symbols to which the Physical Downlink Shared Channel (PDSCH) is allocated. The PDCCH or the EPDCCH is used for the purpose of notifying radio resource allocation information in accordance with the scheduling of the terminal device by the base station apparatus, or control information indicating an amount of adjustment for an increase or decrease in transmit power. Unless otherwise specified, the Physical Downlink Control Channel (PDCCH) that will be described simply below means both of the physical channels, the PDCCH and the EPDCCH.

The terminal device monitors the Physical Downlink Control Channel that is destined for the terminal device itself before transmitting and receiving a Layer 2 message (MAC control element (MAC-CE)) and the Layer 3 message (paging, system information, or the like), and receives the Physical Downlink Control Channel that is destined for the terminal device itself. Thus, the terminal device needs to acquire from the Physical Downlink Control Channel the radio resource allocation information that is referred to as an uplink grant at the time of the transmission and as a downlink grant (a downlink assignment) at the time of the reception. IN a case where D2D is supported, the Physical Downlink Control Channel can notify a D2D grant. Moreover, it is also possible that, in addition to being transmitted in the OFDM symbol described above, the Physical Downlink Control Channel is constituted to be transmitted in a region of a resource block that is allocated in a dedicated manner from the base station apparatus to the terminal device.

A Physical Uplink Control Channel (PUCCH) is used for an acknowledgement response (Acknowledgement/Negative Acknowledgement (ACK/NACK)) for reception of the downlink data that is transmitted on the Physical Downlink Shared Channel, for downlink channel (channel state) information (Channel State Information (CSI)), or for making an uplink radio resource allocation request (a radio resource request or a Scheduling Request (SR)).

Pieces of CSI include a Channel Quality Indicator (CQI), a Precoding Matrix Indicator (PMI), a Precoding Type Indicator (PTI), and a Rank Indicator (RI). Each indicator may be expressed as indication.

The Physical Downlink Shared Channel (PDSCH) is also used for notifying the terminal device of the Layer 3 message, such as the paging or the system information, in addition to the downlink data. The radio resource allocation information of the Physical Downlink Shared Channel is indicated with (notified on) the Physical Downlink Control Channel. The Physical Downlink Shared Channel is transmitted in a state of being allocated to OFDM symbols other than the OFDM symbols in which the Physical Downlink Control Channel is transmitted. That is, the Physical Downlink Shared Channel and the Physical Downlink Control Channel are time-multiplexed within one subframe.

It is also possible that uplink data and uplink control data are mainly transmitted on a Physical Uplink Shared Channel (PUSCH), and that the PUSCH includes control data, such as the CSI or the ACK/NACK. Furthermore, the PUSCH is also used for the terminal device to notify the base station apparatus of uplink control information as the layer 2 message and the layer 3 message, in addition to the uplink data. Furthermore, as is the case in the downlink, the radio resource allocation information of the Physical Uplink Shared Channel is indicated with the Physical Downlink Control Channel.

Uplink Reference Signal (each of which is also referred to as an uplink pilot signal or an uplink pilot channel) include a Demodulation Reference Signal (DMRS) that is used for the base station apparatus to demodulate the Physical Uplink Control Channel (PUCCH) and/or the Physical Uplink Shared Channel (PUSCH) and a Sounding Reference Signal (SRS) that is used for the base station apparatus to mainly estimate an uplink channel state. Furthermore, as the Sounding Reference Signals, there are a periodic Sounding Reference Signal (Periodic SRS) that is periodically transmitted and an aperiodic Sounding Reference Signal (Aperiodic SRS) that is transmitted when there is an instruction to transmit the Aperiodic SRS from the base station apparatus.

A Physical Random Access Channel (PRACH) is a channel that is used for notifying (configuring) a preamble sequence and has a guard time. The preamble sequence is constituted in such a manner that information is notified to the base station apparatus with multiple sequences. For example, in a case where 64 types of sequences are prepared, 6-bit information can be indicated to the base station apparatus. The Physical Random Access Channel is used as means by which the terminal device has access to the base station apparatus.

The terminal device uses the Physical Random Access Channel in order to make the radio resource request in uplink when the Physical Uplink Control Channel is not configured, to make a request to the base station apparatus for the transmission timing adjustment information (which is also referred to as timing advance (TA)) indispensable for adjusting an uplink transmission timing to a reception timing window of the base station apparatus, or so on. Furthermore, the base station apparatus can also make a request to the terminal device for starting of a random access procedure using the Physical Downlink Control Channel.

The layer 3 message is a message that is handled with a protocol of a control-plane (CP) (C-Plane) that is exchanged in radio resource control (RRC) layers of the terminal device and the base station apparatus. RRC signaling or an RRC message can be used synonymously. Moreover, in contrast with the control-plane, a plane for a protocol that is used to handle user data is referred to as a user-plane (U-Plane) (UP).

As the physical channels relating to the D2D, a D2D Synchronization Signal (D2DSS) and a Physical D2D Synchronization Channel (PD2DSCH) are prepared. The D2D synchronization signal is constituted from two synchronization signals, a Primary D2DSS (PD2DSS) and a Secondary D2DSS (SD2DSS).

Furthermore, it is considered that the physical D2D synchronization channel is transmitted from the terminal device that transmits the D2D and is transmitted for the purpose of notifying control information (for example, a synchronization ID relating to the terminal device that performs transmission, a resource pool, a system bandwidth, a TDD subframe configuration, or the like) relating to the D2D, a D2D frame number, or the like.

Furthermore, it is considered that the terminal device that transmits the D2D transmits scheduling assignments (SA) to the terminal device that receives the D2D. The SA includes ID information for identifying at least contents (a type) of the D2D, and notifies a radio resource pattern (Resource Patterns for Transmission (RPT)) for transmission data, which corresponds to the ID information, explicitly and implicitly. It is considered that the SA and the transmission data relating to the D2D uses the PUSCH. That is, the terminal device that receives the D2D needs to receive the PUSCH and perform cording.

Moreover, detailed descriptions of physical channels or physical signals other than these are omitted because they have no strong relationship with each embodiment of the present invention. As physical channels or physical signals of which the descriptions are omitted, there are a Physical Control Format Indicator CHannel (PCFICH), a Physical Hybrid ARQ Indicator CHannel (PHICH), a Physical Multicast CHannel (PMCH) and the like.

[Wireless Network and Cell Type]

A range (a communication area) in which each frequency is available for communication, which is controlled by the base station apparatus, is regarded as a cell. At this time, the communication area that is covered by the base station apparatus may vary in size and shape from one frequency to another. Furthermore, the area that is covered may vary from one frequency to another. When cells that are covered by different types of base station apparatuses or that have different radii are present in a mixed manner in an area where the same frequency or different frequencies are available and one communication system is formed, this wireless network is referred to as a heterogeneous network.

The terminal cell may regard as a suitable cell a cell in which, based on broadcast information that is notified by the base station apparatus, it is determined that the access by the terminal device is not disapproved and in which the reception quality of the downlink satisfies a prescribed condition and as a result, a normal service is approved by camping on the cell. When moving from the cell on which the terminal device camps to a different cell, the terminal device moves according to a cell reselection procedure when in a non-radio resource control connection state (in an idle state (idle mode) or while non-communication is in progress) and moves according to a handover procedure at the time of a radio resource control connection (in a connected state (Connected mode) or while communication is in progress).

The terminal device may regard a cell that is not determined as being a suitable cell according to a cell selection (cell reselection) procedure, as a cell (limited cell) in which only one or several services are approved. Moreover, the terminal device can camp on even the limited cell. The one or several services includes an emergency call communication service (an emergency call). The terminal device may determine that, when in a state (in an idle state) where the terminal device camps on a cell or when in a connected state in a certain cell, the terminal device is located in an area where the communication with the base station apparatus is possible, that is, is within a service section (within an in-coverage area) of the cell.

The base station apparatus manages one or more cells at every frequency. One base station apparatus may manage multiple cells. Cells are categorized into multiple types according to the size (cell size) of an area where communication with the terminal device is possible. For example, cells are categorized into macro cells and small cells. Generally, the small cell is a cell that has a coverage area with a radius of several meters to several-ten meters. Furthermore, the small cells are categorized into femto cells, pico cells, nano cells, and the like according to their coverage areas.

When it is possible that the terminal device communicates with a certain base station apparatus, among cells that are covered by the certain base station apparatus, a cell that is configured in such a manner that the cell is used for the communication with the terminal device is referred to as a serving cell, and the other cells that are not used for the communication are referred to as neighboring cells.

[D2D]

A basic technology for the D2D is briefly described.

The D2D is divided at least into a technology (Discovery) for discovering the terminal device in proximity and a technology (Direct communication (which is also referred to as Communication)) for the terminal device to perform direct communication with one or multiple terminal devices.

In the D2D, a resource (radio resource) or a configuration relating to the D2D that is used by the terminal device may be configured (controlled) or be set (controlled) by the base station apparatus. That is, in a case where the terminal device is in the non-radio resource control connection state (the idle state (idle mode)), the radio resource or the configuration relating to the D2D may be notified by the broadcast information for every cell, and, in a case where the terminal device is in the radio resource control connection state (the connected state), the radio resource or the configuration relating to the D2D may be notified by the RRC message. That is, the D2D is realized by the D2D-capable or D2D-supported terminal device in which direct communication with other terminal devices is possible, and the base station apparatus in which control of a resource for the direct communication with the terminal devices is possible.

Furthermore, in the direct communication, a radio resource for transmitting the scheduling assignments (SA) is provided to the terminal device from a pool (an SA resource pool) for resources that are pooled for the SA. The terminal device that transmits the D2D transmits the SA using the radio resource (a time and frequency) that is included in the resource pool. The terminal device that receives the D2D receives the SA using the radio resource (the time and the frequency) that is included in the resource pool.

Furthermore, in the direct communication, the radio resource for transmitting the transmission data relating to the D2D is provided to the terminal device from the pool (D2D data resource pool) of resources that are pooled for the transmission data relating to the D2D. The terminal device that transmits the D2D transmits the transmission data relating to the D2D using the radio resource (the time and the frequency) that is designated from the resource pool. Furthermore, the terminal device that receives the D2D receives the transmission data relating to the D2D using the radio resource (the time and the frequency) that is designated from the resource pool. The resource pool may be indicated by frequency information, information indicating a range of resource blocks that are allocated, information on a frame number or a subframe number from which the resource pool is started and an offset value, or the like.

At this point, the resource pool (a first resource pool) that results from pooling the radio resources that are used for the SA, and the resource pool (a second resource pool) that results from pooling the radio resources that are used for the transmission data relating to the D2D may be pre-configured (reserved) by the broadcast information, may be individually notified (or broadcast) by the base station apparatus to every terminal device, may be notified (or broadcast) by a different terminal device, may be pre-configured, and may be allocated in a semi-static manner.

In a case where the allocation is performed with a pre-configuration, this configuration may be typically recorded in a Subscriber Identity Module (SIM). The SIM may be an IC card that is provided in hardware, and may be provided in software.

At this point, a method of allocating the radio resource (the SA and the transmission data relating to the D2D) relating to the D2D to the terminal device from the resource pool, a method (which is also referred to as Mode 1 or a scheduled type) may be used in which the terminal device notifies the base station apparatus that the transmission data relating to the D2D is present and thus the base station apparatus individually allocates a transmission resource to the terminal device. Furthermore, a method (which is also referred to as Mode 2 or an autonomous type) may be used in which, for use, the terminal device selects the broadcast information or the transmission resource for the resource pool that is pre-configured (reserved).

Mode 1 is used when the terminal device is located in an in-coverage range, and Mode 2 is a mode for the direct communication, which is used when the terminal device is not located in the in-coverage range (is out of coverage). Moreover, even in a case where the radio resource that is allocated by the base station apparatus is used (that is, is in Mode 1), there is a case (that is, Mode 2) where the terminal device temporarily uses the radio resource that is selected by the terminal device, in an RRC radio resource reconnection procedure.

Figure 9:
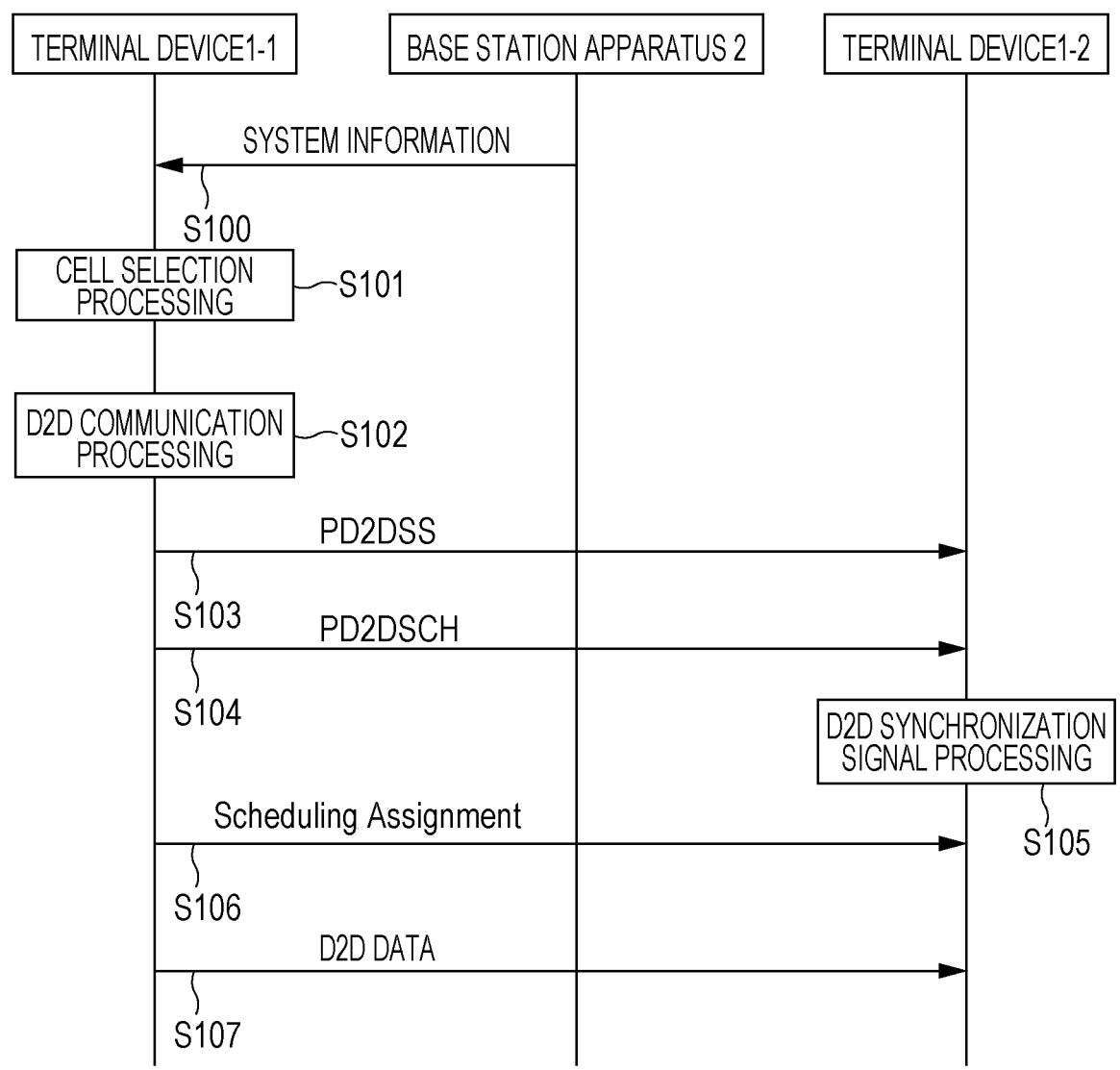
FIG. 9 is a flowchart illustrating an example of a case where the terminal device that transmits the D2D and the terminal device that receives the D2D perform D2D communication.

FIG. 9 is a flowchart illustrating an example of a case where a terminal device 1-1 (a D2D transmission UE) that transmits the D2D and a terminal device 1-2 (a D2D reception UE) that receives the D2D perform D2D communication with each other.

In FIG. 9, first, when camping on a cell that is covered by the base station apparatus 2, the terminal device 1-1 receives the system information message that is the RRC message (Step S100). The system information message is used for the purpose of notifying the terminal device 1 of the configuration information (for example, PD2DSS configuration information, PD2DSCH configuration information, D2D information on the neighboring cell, resource pool information for the SA, resource pool information for the transmission data relating to the D2D, approval information on Mode 1/Mode 2, or the like) relating to the D2D. From the base station apparatus 2, these pieces of information may be transmitted in a certain independent system information block (for example, SIB 18) and, if the terminal device 1-1 (the terminal device 1-2) is in communication, may be transmitted with a dedicated RRC message.

Next, in a case where the terminal device 1-1 is interested in the D2D, based on information of the received system information message, the terminal device 1-1 performs the cell selection (Step S101). In this cell selection processing, according to the broadcast information indicating that the D2D is supported in an uplink band to which a radio frequency (RF) circuit of the terminal device 1-1 corresponds, the terminal device 1-1 changes a camping cell if need arises.

Step S101 is performed in the terminal device 1-2 in the same manner. That is, if the terminal device 1-2 is interested in the D2D, based on the information of the received system information message, according to the information indicating that the D2D is supported in the uplink band e D2D to which a radio frequency (RF) circuit of the terminal device 1-2 corresponds, the terminal device 1-2 performs the cell selection processing if need arises.

Subsequently, the terminal device 1-1 starts communication processing for the D2D (Step S102). More specifically, the terminal device 1-1 determines a transmission code or data for the PD2DSS and the PD2DSCH, and selects the radio resource from the resource pool that is available to the terminal device 1-1 in the idle state.

Moreover, in a case where in the base station apparatus 2, the D2D in Mode 2 is not approved, in order to perform the D2D in Mode 1, the terminal device 1-1 starts a radio resource control connection establishment (RRC Connection Establishment) procedure for the base station apparatus 2, and starts the D2D in the connected state, but this is omitted in the drawings.

The terminal device 1-1 performs PD2DSS transmission (Step S103) in the uplink band (an uplink frequency) in which the D2D transmission is possible, and the PD2DSCH transmission (Step S104). Moreover, there is also a case where the PD2DSCH is not transmitted. With D2D synchronization signal processing in Step S105, the terminal device 1-2 receives the PD2DSS (PD2DSCH) that is transmitted by the terminal device 1-1, and establishes wireless synchronization to the terminal device 1-1.

Furthermore, the terminal device 1-1 selects a resource for the SA from among resources for the SA that are indicated with the resource pool information for the SA, and transmits the SA to the terminal device 1-2 using the selected resource (Step S106). Furthermore, the terminal device 1-1 selects the resource for the transmission data from the resource pool information for the transmission data, based on the selected SA, and transmits data relating to the D2D to the terminal device 1-2 using the selected resource (Step S107).

Furthermore, the terminal device 1-2 receives (monitors) the SA that is transmitted by the terminal device 1-1, in the resource that is indicated with the resource pool information for the SA. Furthermore, the terminal device 1-2 receives (monitors) the data relating to the D2D that is transmitted by the terminal device 1-1 in the resource that is indicated with the SA, in the resource pool information for the transmission data.

Suitable embodiments of the present invention will be described in detail below considering the matters described above and referring to the accompanying drawings. Moreover, when the embodiments of the present invention are described, in a case where it is determined that a specific description of a known function or constitution associated with the embodiments of the present invention makes the gist of the embodiment of the present invention indefinite, a detailed description thereof is omitted.

First Embodiment

A first embodiment of the present invention will be described in detail below.

FIG. 1 is a block diagram illustrating an example of a terminal device 1 according to the first embodiment of the present invention. The present terminal device 1 is constituted at least from a reception unit 101, a demodulation unit 102, a decoding unit 103, a reception data control unit 104, a physical layer control unit 105, a transmission data control unit 106, a coding unit 107, a modulation unit 108, a transmission unit 109, a radio resource control unit 110, and a cell selection unit 111. The "units" in the drawings are elements that are also expressed with the terms circuit, constituent element, device, unit, and the like and that realize a function of the terminal device 1 and each procedure.

Moreover, there is a case where the terminal device 1 in each of which the D2D is possible (each of which is interested in the D2D or each of which supports the D2D) are collectively simply referred to as the terminal device 1 for description. Moreover, in the communication relating to the D2D, the terminal device 1 can be either of the terminal device 1 (the D2D transmission (the terminal device 1-1 in FIG. 9)) that transmits the D2D, and the terminal device 1 (the D2D reception (the terminal device 1-2 in FIG. 9)) that receives the D2D.

The radio resource control unit 110 performs each function of the Radio Resource Control (RRC) layer that administers the radio resource control of the terminal device 1. Furthermore, the reception data control unit 104 and the transmission data control unit 106 perform each function in a Medium Access Control (MAC) layer that manages a data link layer, a Radio Link Control (RLC) layer, and a Packet Data Convergence Protocol (PDCP) layer.

Moreover, the terminal device 1 may be constituted to include some or all of blocks (the reception unit 101, the demodulation unit 102, and the decoding unit 103) in a reception system, multiple frequencies (frequency bands and frequency bandwidths), and blocks (the coding unit 107, the modulation unit 108, and the transmission unit 109) in a transmission system, in order that reception processing and transmission processing at the multiple frequencies (the frequency bands or the frequency bandwidths) or within the same subframe of a certain cell is supported concurrently with each other (simultaneously).

With regard to the reception processing by the terminal device 1, reception data control information is input from the radio resource control unit 110 into the reception data control unit 104, and physical layer control information that is a control parameter for controlling each block is input into the physical layer control unit 105. The physical layer control information is information that is constituted from reception control information and transmission control information and that includes a parameter configuration indispensable for wireless communication control by the terminal device 1.

The physical layer control information is configured by a wireless connection resource configuration that is transmitted in a dedicated manner from the base station apparatus 2 to the terminal device 1, cell-specific broadcast information, a system parameter, or the like, and, if need arises, is input by the radio resource control unit 110 into the physical layer control unit 105. The physical layer control unit 105 suitably inputs the reception control information, which is control information relating to the reception, to the reception unit 101, the demodulation unit 102, and the decoding unit 103.

Included in the reception control information are pieces of information, as downlink scheduling information, such as reception frequency band information, reception timing relating to the physical channel and the physical signal, a multiplexing method, radio resource control information, SA resource pool information, D2D resource pool information, and the like. Furthermore, the reception data control information is downlink control information that includes secondary cell deactivation timer information, DRX control information, multicast data reception information, downlink retransmission control information, SA reception control information, D2D reception control information, and the like. Additionally, control information relating to the downlink in each of the MAC layer, the RLC layer, and the PDCP layer is included in the reception data control information.

A receive signal is received in the reception unit 101. In the case of the D2D, there is a case where the receive signal is a transmit signal that is transmitted by the terminal device 1. The reception unit 101 receives a signal from the base station apparatus 2 in accordance with the frequency and the frequency band that are notified with the reception control information. The signal that is received is input into the demodulation unit 102. The demodulation unit 102 performs demodulation of the signal. The demodulation unit 102 inputs a post-demodulation signal into the decoding unit 103. The decoding unit 103 decodes the signal that is input, and inputs each piece of data (which is also referred to as downlink data, downlink control data, or a downlink transport block) that results from the decoding, into the reception data control unit 104. Furthermore, as well as each piece of data, the MAC control element that is transmitted from the base station apparatus 2 is decoded in the decoding unit 103, and related data is input into the reception data control unit 104.

The reception data control unit 104 performs control (for example, cell activation/deactivation, DRX control, transmission timing adjustment, and the like) of the physical layer control unit 105, which is based on the received MAC control element, performs buffering of each piece of data that results from the decoding, and performs error correction control (HARQ) of data that is retransmitted. Each piece of data that is input into the reception data control unit 104, that is, related data is input into (transferred to) the radio resource control unit 110.

The cell selection unit 111 acquires a result (RSRP, RSRQ, or the like) of measurement of the received signal and/or channel, from the demodulation unit 102, the decoding unit 103, or the like, and has a function of performing a cell selection procedure based on a cell selection parameter, such as access limitation information or an offset value that is received from the broadcast information or the like. Furthermore, based on a cell reselection parameter relating to a cell reselection condition, the cell selection unit 111 has a function of performing the cell reselection procedure on the neighboring cell at each of the intra-frequency, the inter-frequency, and the frequency for inter-RAT.

The cell selection unit 111 at least performs evaluation (assessment or ranking) of the neighboring cell using a result of measurement of the serving cell on which the terminal device 1 itself camps, and a result of measurement of the neighboring cell in the cell reselection procedure, and, in a case where a cell more suitable than the current serving cell is detected, changes the cell on which the terminal device 1 itself camps. In the cell reselection, a cell at the inter-frequency (RAT) that is measured is determined based on a priority level (priority) of a frequency that is designated for every frequency (RAT).

The inter-frequency (RAT) that has a priority level which is higher than a frequency priority level of a frequency (a serving frequency) at which the terminal device 1 itself camps has to be measured at all times regardless of the result (the reception quality) of the measurement of the serving cell, but a cell at the inter-frequency (RAT) that is at the same as or at a priority level lower than the frequency priority level of the frequency at which the terminal device 1 itself camps may be measured only in a case where each of the results of the measurement of the serving cell is at a certain threshold or below. The result of the serving cell, for example, is indicated using the RSRP or the RSRQ.

Moreover, in a case where information (a neighboring cell list) on the neighboring cell is notified with the broadcast information, it is also possible that the cell selection unit 111 performs the cell reselection using the information on the neighboring cell. Multiple parameters relating to the cell selection procedure and the cell reselection procedure, which are used by the cell selection unit 111, are configured by the radio resource control unit 110.

With regard to the transmission processing by the terminal device 1, transmission data control information is input from the radio resource control unit 110 into the transmission data control unit 106, and the physical layer control information that is a control parameter for controlling each block is input into the physical layer control unit 105. The physical layer control unit 105 suitably inputs the transmission control information that is control information relating to the transmission, into the coding unit 107, the modulation unit 108, and the transmission unit 109. Included in the transmission control information are pieces of information, as uplink scheduling information, such as coding information, modulation information, transmission frequency band information, transmission timing relating to the physical channel and the physical signal, the multiplexing method, radio resource arrangement information, the SA resource pool information, the D2D resource pool information, and the like.

Furthermore, the transmission data control information is uplink control information that includes DTX control information, the random access configuration information, uplink shared channel information, logical channel priority information, the resource request configuration information, cell group information, uplink retransmission control information, a buffer status report, D2D transmission control information, and the like. The radio resource control unit 110 may configure multiple pieces of random access configuration information that correspond to multiple cells, respectively, for the transmission data control unit 106.

Furthermore, the radio resource control unit 110 manages the transmission timing adjustment information and the transmission timing timer that are used for adjustment of the uplink transmission timing, and manages an uplink transmission timing state (a transmission timing adjusted state or a transmission timing non-adjusted state) for every cell (every cell group or every TA group). The transmission timing adjustment information and the transmission timing timer are included in the transmission data control information.

Moreover, in a case where there is a need to manage multiple uplink transmission timing states, the transmission data control unit 106 manages the transmission timing adjustment information that corresponds to the uplink transmission timing in each of the multiple cells (the cell group or the TA group). Included in the resource request configuration information are at least maximum transmission counter configuration information and radio resource request prohibition timer information. The radio resource control unit 110 may configure multiple pieces of resource request configuration information that correspond to multiple cells, respectively, for the transmission data control unit 106.

The transmission data (which is also referred to as the uplink data, the uplink control data, or an uplink transport block) that is originated in the terminal device 1 is input from the radio resource control unit 110 (or a higher layer unit such as a non-access stratum layer unit (not illustrated)) into the transmission data control unit 106 at an arbitrary timing. At this time, the transmission data control unit 106 calculates an amount of transmission data (an amount of uplink buffer) that is input. Furthermore, the transmission data control unit 106 has a function of determining whether the transmission data that is input is data that belongs to the control-plane or is data that belongs to the user-plane.

Furthermore, when the transmission data is input, the transmission data control unit 106 stores the transmission data in an uplink buffer (not illustrated) within the transmission data control unit 106. Furthermore, based on a priority level of the transmission data that is stored in the uplink buffer, the transmission data control unit 106 generates the MAC PDU that does not perform multiplexing and assembling. Then, the transmission data control unit 106 determines whether or not the radio resource indispensable for the transmission of the transmission data that is input is allocated to the terminal device 1. The transmission data control unit 106 selects any one of the radio resource request that uses the Physical Uplink Shared Channel (PUSCH) and the Physical Uplink Control Channel (SR-PUCCH) and the radio resource request that uses the Physical Random Access Channel, based on radio resource allocation, and makes a request to the physical layer control unit 105 for control processing for transmitting the selected channel.

At this point, the transmission data control unit 106 generates buffer status reports that vary based on whether the transmission that is input is normal transmission data for the base station apparatus 2 or is D2D transmission data for a different terminal device 1. In other words, the transmission data control unit 106 generates a buffer status report (a normal buffer status report (Normal BSR) or a first buffer status report) that is based on an amount of buffer for the normal transmission data, and a buffer status report (a D2D buffer status report (ProSe BSR) or a second buffer status report) that is based on an amount of buffer for the D2D transmission data. Furthermore, in accordance with the transmission control information, the coding unit 107 suitably codes each piece of data and inputs a result of the coding into the modulation unit 108.

Based on a channel architecture in which each piece of coded data is transmitted, the modulation unit 108 performs suitable modulation processing. As well as mapping each piece of data being modification-processed to the frequency domain, the transmission unit 109 converts a signal in the frequency domain into a signal in the time domain, superimposes the resulting signal on a carrier wave in a fixed frequency, and performs power amplification. In accordance with the transmission timing adjustment information for every cell (every cell group or every TA group), which is input from the radio resource control unit 110, the transmission unit 109 further adjusts the uplink transmission timing. It is also possible that the Physical Uplink Shared Channel to which the uplink control data is mapped includes, for example, the layer 3 message (a radio resource control message or the RRC message) in addition to the user data.

Other constituent elements of the terminal device 1 and a transfer path for data (the control information) between the constituent elements are omitted in FIG. 1, but it is apparent that multiple blocks that have other functions indispensable for the terminal device 1 to operate are retained as constituent elements. For example, the non-access stratum layer unit that administers control with a core network, or an application layer unit is present above the radio resource control unit 110.

Figure 2:
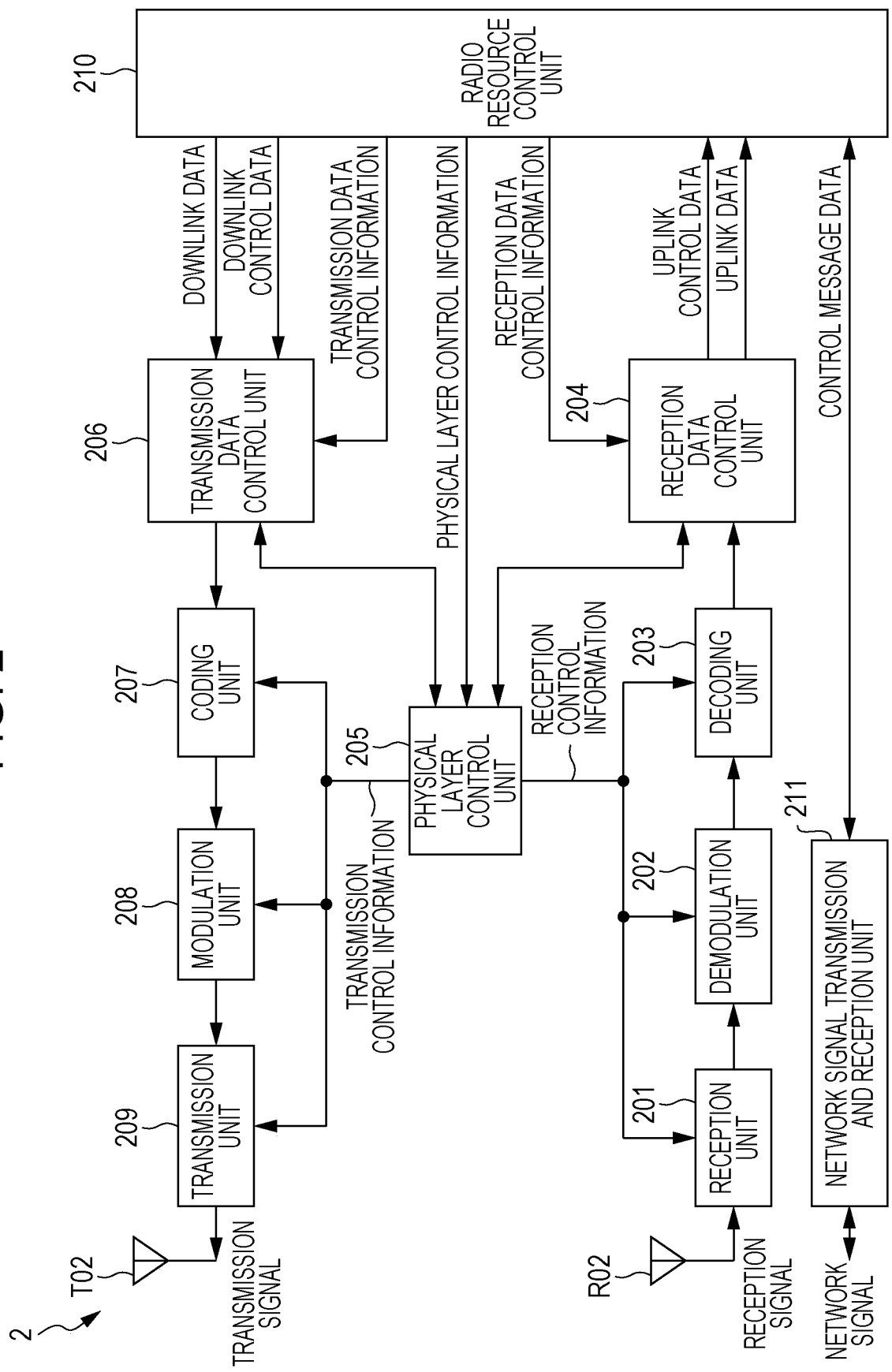
FIG. 2 is a block diagram illustrating an example of a schematic constitution of a base station apparatus according to the embodiment of the present invention.

FIG. 2 is a block diagram illustrating an example of a base station apparatus 2 according to the first embodiment of the present invention. The present base station apparatus is constituted at least from a reception unit 201, a demodulation unit 202, a decoding unit 203, a reception data control unit 204, a physical layer control unit 205, a transmission data control unit 206, a coding unit 207, a modulation unit 208, a transmission unit 209, a radio resource control unit 210, and a network signal transmission and reception unit 211. The "units" in the drawings are elements that are also expressed with the terms circuit, constituent element, device, unit, and the like and that perform a function of the base station apparatus 2 and realize each procedure.

The radio resource control unit 210 performs each function of the Radio Resource Control (RRC) layer that administers the radio resource control of the base station apparatus 2. Furthermore, the reception data control unit 204 and the transmission data control unit 206 perform each function in the Medium Access Control (MAC) layer that manages the data link layer, the Radio Link Control (RLC) layer, and the Packet Data Convergence Protocol (PDCP) layer.

Moreover, the base station apparatus 2 may be constituted to include some or all of blocks (the reception unit 201, the demodulation unit 202, and the decoding unit 203) in the reception system, multiple frequencies (frequency bands and frequency bandwidths) and blocks (the coding unit 207, the modulation unit 208, and the transmission unit 209) in the transmission system, in order that, by using the carrier aggregation and the like, the transmission and reception processing at multiple frequencies (frequency bands or frequency bandwidths) or within the same subframe of a cell is supported.

The radio resource control unit 210 inputs the downlink data and the downlink control data into the transmission data control unit 206. In a case where the MAC control element that is to be transmitted to the terminal device 1 is present, the transmission data control unit 206 inputs the MAC control element and each piece of data (the downlink data or the downlink control data) into the coding unit 207. The coding unit 207 codes the MAC control element and each piece of data, which are input, and inputs results of the coding into the modulation unit 208. The modulation unit 208 performs modulation of the coded signal.

Furthermore, a signal that is modulated in the modulation unit 208 is input into the transmission unit 209. After mapping each piece of data being input to the frequency domain, the transmission unit 209 converts a signal in the frequency domain into a signal in the time domain, superimposes the resulting signal on a carrier wave in the fixed frequency, performs the power amplification, and performs the transmission. The Physical Downlink Shared Channel to which the downlink control data is mapped typically constitutes the layer 3 message (the RRC message).

Furthermore, the reception unit 201 converts the signal that is received from the terminal device 1 into a digital signal in a baseband. In a case where cells at multiple different transmission timings are configured for the terminal device 1, the reception unit 201 receives the signal at different timings for every cell (every cell group or every TA group). The digital signal that results from the conversion in the reception unit 201 is input into the demodulation unit 202 and is demodulated. The signal that results from the demodulation in the demodulation unit 202 is subsequently input into the decoding unit 203. The decoding unit 203 decodes the signal that is input, and inputs each piece of data (the uplink data and the uplink control data) that results from the decoding, into the reception data control unit 204. Furthermore, as well as each piece of data, the MAC control element that is transmitted from the terminal device 1 is decoded in the decoding unit 203, and related data is input into the reception data control unit 204.

The reception data control unit 204 performs control (for example, control relating to a power headroom report, control relating to the Buffer Status Report, or the like) of the physical layer control unit 205, which is based on the received MAC control element, performs buffering of each piece of data that results from the decoding, and performs the error correction control (HARQ) of data that is retransmitted. Each piece of data that is input into the reception data control unit 204 is input into (transferred to) the radio resource control unit 210.

Furthermore, in a case where the buffer status report from the terminal device 1 is input from the decoding unit 203, the reception data control unit 204 determines whether the transmission resource request is a transmission resource request for communication with the base station apparatus itself or a transmission resource request for a device-to-device data communication, and configures a transmission resource that is to be allocated to the terminal device 1.

The physical layer control information that is indispensable for these type of control of each block is information that is constituted from the reception control information and the transmission control information and that includes a parameter configuration indispensable for wireless communication control by the base station apparatus 2. The physical layer control information is configured by the higher-level network apparatus (an MME, a gateway apparatus (SGW), an OAM, or the like) or the system parameter, and, if need arises, is input by the radio resource control unit 210 into the control unit 204.

The physical layer control unit 205 inputs the physical layer control information associated with the transmission, as the transmission control information, into each of the blocks, that is, the coding unit 207, the modulation unit 208, and the transmission unit 209, and suitably inputs the physical layer control information associated with the reception, as the reception control information, into each of the blocks, that is, the reception unit 201, the demodulation unit 202, and the decoding unit 203.

The control information relating to the uplink, of the terminal device 1 for each of the MAC layer, the RLC layer, and the PDCP layer of the base station apparatus 2 is included in the reception data control information. Furthermore, the control information relating to the downlink, of the terminal device 1 for each of the MAC layer, the RLC layer, and the PDCP layer of the base station apparatus 2 is included in the transmission data control information. That is, the reception data control information and transmission data control information are configured for every terminal device 1.

The network signal transmission and reception unit 211 performs the transmission (transfer) or reception of a control message between the base station apparatuses 2 or between the higher-level network apparatus (the MME or the SGW) and the base station apparatus 2, or of the user data. Other constituent elements of the base station apparatus 2 and the transfer path for data (the control information) between the constituent elements are omitted in FIG. 2, but it is apparent that multiple blocks that have other functions indispensable for the base station apparatus 2 to operate are retained as constituent elements. For example, a Radio Resource Management unit or the application layer unit is present over the radio resource control unit 210.

Figure 3:
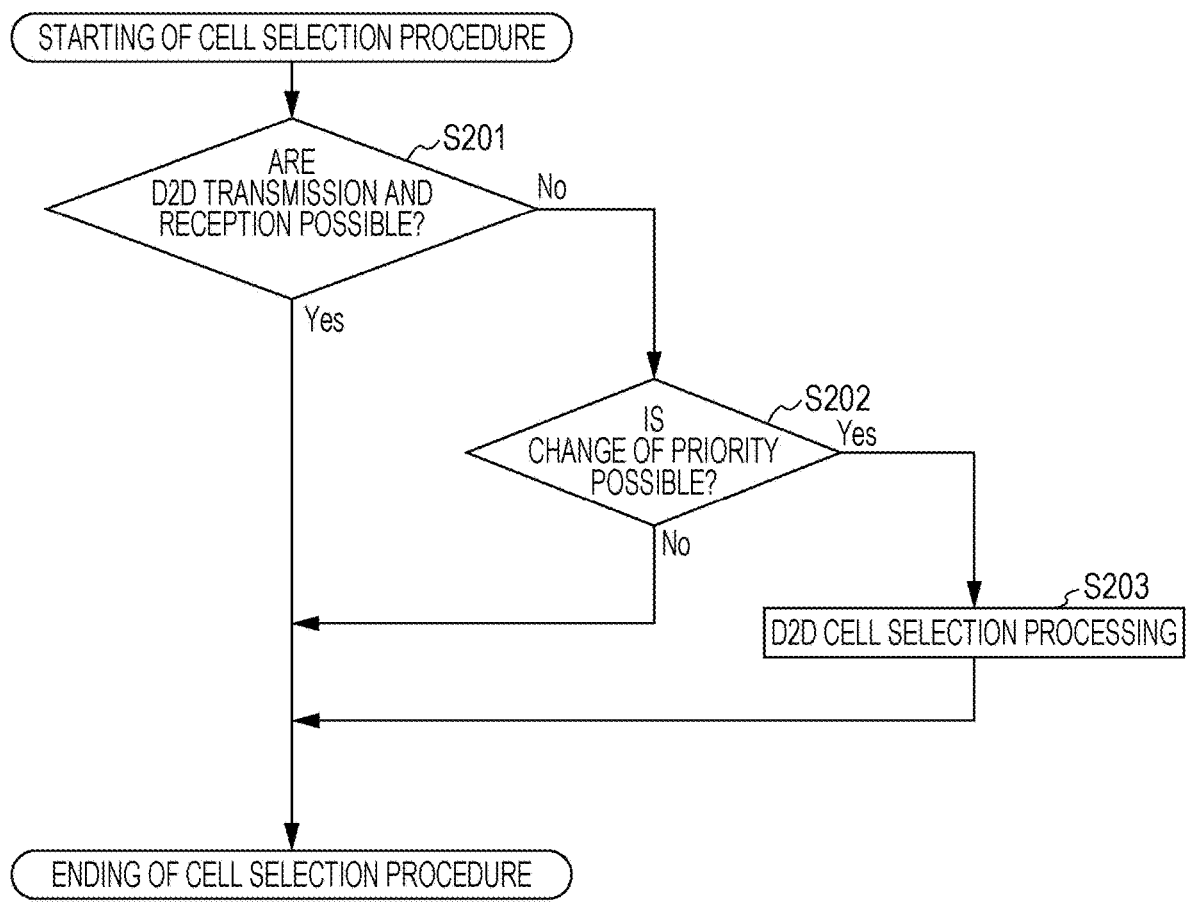
FIG. 3 is an example of a flowchart relating to cell selection according to a first embodiment of the present invention.

FIG. 3 illustrates an example of a flowchart relating to cell selection (which includes cell reselection) according to the first embodiment of the present invention.

The flowchart in FIG. 3 is started in a case where the terminal device 1 is interested in the D2D. The case where the terminal device 1 is interested in the D2D, for example, indicates a case where the terminal device 1 is a terminal device that is capable of corresponding to a sequence of control relating to the D2D and where an instruction to execute transmission or reception of a service relating to the D2D or both of the transmission and reception is provided by the higher layer, such as the NAS layer unit or the application layer unit, or the like. At this time, in Step S201, the terminal device 1 determines whether or not the transmission and reception of the D2D are possible in the cell on which the terminal device 1 camps.

Furthermore, the terminal device 1 performs initial cell selection or the cell reselection, and normally camps on a certain arbitrary cell. The normal camping indicates a state where the result of the measurement of the cell satisfies a cell selection reference (that is, the result of the measurement of the cell is equal to or greater than a certain value) and where with the access limitation information that is indicated with the broadcast information, the terminal device 1 camps, or is positioned within an area (with an in-coverage area) of the cell where a normal service is not limited.

In Step S201, based on a frequency (a frequency band) in the cell on which the terminal device 1 camps and on a frequency at which the terminal device 1 itself perform the transmission and reception, the terminal device 1 determines whether or not the transmission and reception of the D2D are possible.

Figure 4:
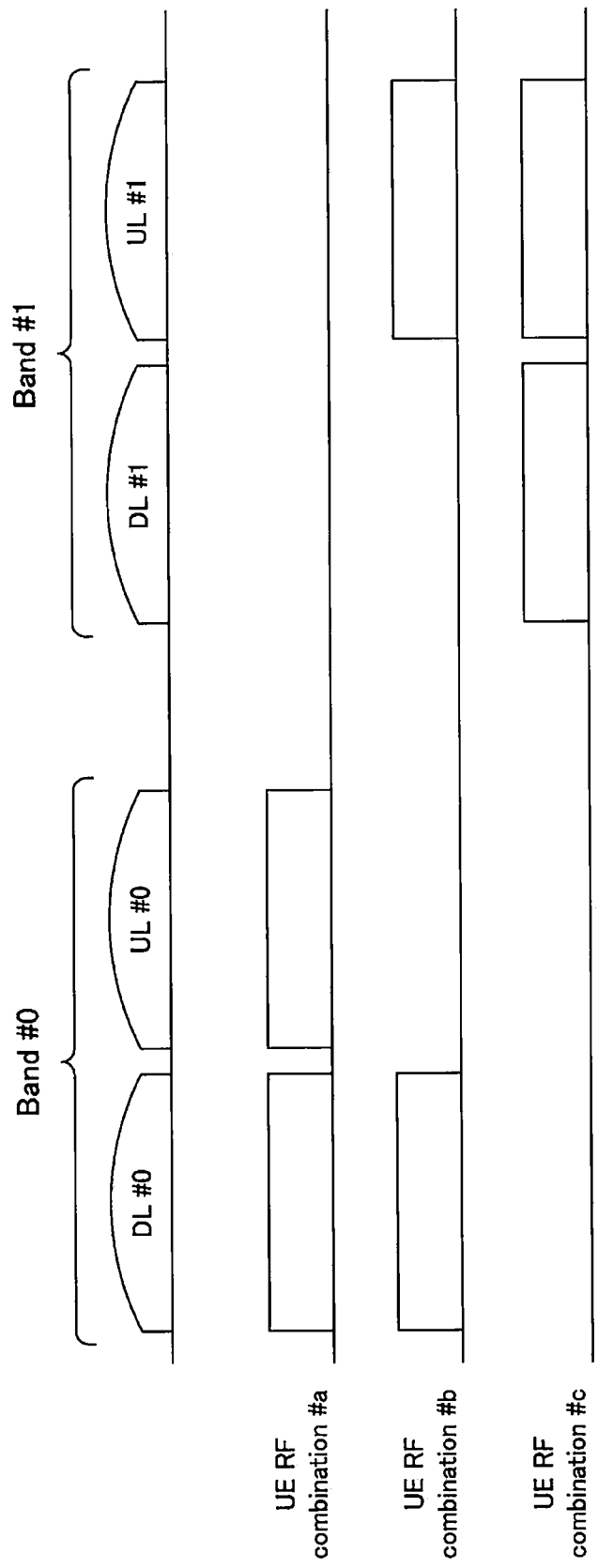
FIG. 4 is a diagram illustrating an example of a combination of frequency bands in which transmission and reception are possible in a terminal device according to the first embodiment of the present invention.

A relationship between the frequency in the cell on which the terminal device 1 camps and the frequency at which the terminal device 1 can perform the transmission and reception is described referring to FIG. 4.

FIG. 4 is a diagram illustrating an example of a band combination of frequency bands in which the transmission and reception are possible in the terminal device 1 that is capable of the D2D. The combination of frequency bands is configured as RF capability, for every terminal device 1.

DL #0 and DL #1 in the drawings indicate downlink frequencies, respectively, and UL #0 and UL #1 indicate uplink frequencies, respectively. Furthermore, DL #0 and UL #0 are among frequencies in Band #0 that is a certain band, and DL #1 and UL #1 are among frequencies in Band #1 that is another certain frequency band.

FIG. 4 illustrates three combinations as combinations of RFs that are handled in the terminal device 1.

A first combination (UE RF Combination #a) indicates that an RF of the terminal device 1 tunes to frequencies in DL #0 and UL #0 and that the reception at the frequency in DL #0 is possible and the transmission at the frequency in UL #0 is possible in the same manner. Furthermore, a correspondence to the D2D is present, this indicates that reception (that is, reception of the PD2DSS, the PD2DSCH, and the PUSCH) of the D2D in the frequency in UL #0 is possible.

A second combination (UE RF Combination #b) indicates that the RF of the terminal device 1 tunes to frequencies in DL #0 and UL #1 and that the reception at the frequency in DL #0 is possible and the transmission at the frequency in UL #1 is possible in the same manner. Furthermore, the correspondence to the D2D is present, this indicates that the reception (that is, reception of the PD2DSS, the PD2DSCH, and the PUSCH) of the D2D in the frequency in UL #1 is possible.

A third combination (UE RF Combination #c) indicates that the RF of the terminal device 1 tunes to frequencies in DL #1 and UL #1 and that the reception at the frequency in DL #1 is possible and the transmission at the frequency in UL #1 is possible in the same manner. Furthermore, the correspondence to the D2D is present, this indicates that the reception (that is, reception of the PD2DSS, the PD2DSCH, and the PUSCH) of the D2D in the frequency in UL #1 is possible.

At this point, it is assumed that a frequency at which the terminal device 1 that is capable of the first combination camps is in DL #0 and a frequency (D2D supported frequency) at which the transmission and reception of the D2D are supported (approved) is in UL #1. At this time, in a case where at the RF of the terminal device 1, the second combination is further possible, the terminal device 1 determines that it is possible that the D2D is transmitted and received in a state where the terminal device 1 itself normally camps on a cell in DL #0. On the other hand, in a case where at the RF of the terminal device 1, only the first combination and the third combination are possible, the terminal device 1 determines that the D2D is difficult to transmit and receive in the state where the terminal device 1 itself normally camps on the cell in DL #0.

In this manner, for a combination of a downlink frequency in the cell on which the terminal device 1 camps and an uplink frequency at which the transmission and reception of the D2D is supported, the terminal device 1 determines in Step S201 whether or not the RF of the terminal device 1 is supported.

In a case where it is determined that the RF of the terminal device 1 is supported, the terminal device 1 determines that the transmission and reception of the D2D are possible without changing a current cell (Yes in Step S201), and ends processing in the present flow. On the other hand, in a case where it is determined that the RF of the terminal device 1 is not supported, the terminal device 1 determines that the transmission and reception of the D2D is impossible without changing the current cell (No in Step S201).

Subsequently, in Step S202, the terminal device 1 makes a determination of whether or not a change of a priority level of a frequency in the cell selection is approved.

The base station apparatus 2 may notify the terminal device 1 whether or not it is possible to change the priority level of the frequency, with the broadcast information (the system information message (SIB 18)), for every cell, and may notify every terminal device 1 whether or not it is possible to change the priority level of the frequency, with the dedicated RRC message. Furthermore, according to the pre-configuration in the terminal device 1 itself, the terminal device 1 may determine whether or not it is possible to change the priority level of the frequency.

The base station apparatus 2 notifies the terminal device 1 whether or not it is possible to change the priority level, using a method, for example, such as (1) a method in which whether or not it is possible to change a priority level in every frequency band in the uplink, which corresponds (is linked) to a downlink frequency in a certain cell, is indicated along with the downlink frequency, or (2) a method in which whether or not it is possible to change the priority level in every frequency band in the uplink, which corresponds (is linked) to the downlink frequency in a certain cell, is indicted independently of the downlink frequency.

Figure 5:
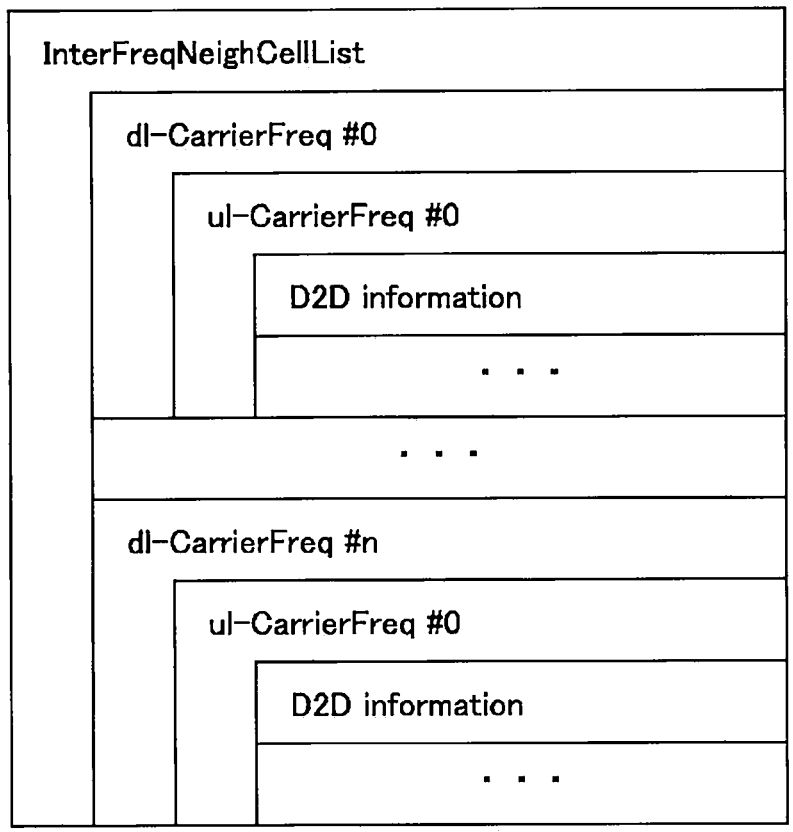
FIG. 5 is a diagram illustrating an example of a data structure of information that is notified by the base station apparatus to the terminal device according to the first embodiment of the present invention.
Figure 6:
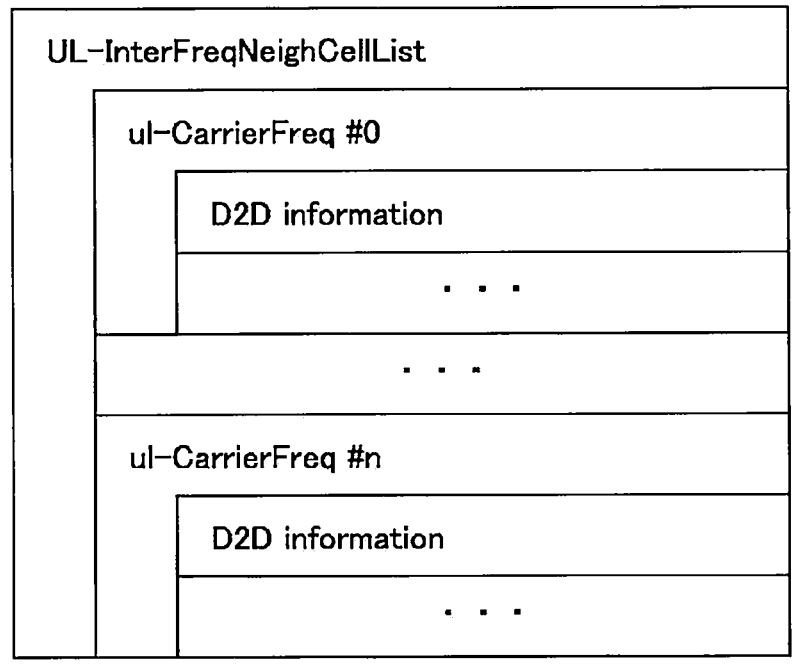
FIG. 6 is a diagram illustrating another example of the data structure of information that is notified by the base station apparatus to the terminal device according to the first embodiment of the present invention.

Examples of cases (1) and (2) are described referring to FIGS. 5 and 6, respectively. FIGS. 5 and 6 illustrate an example of a data structure of information that is notified to the terminal device 1 by the base station apparatus 2.

FIG. 5 illustrates an example in which an inter-frequency neighboring cell list (InterFreqNeighCellList) is notified to the terminal device 1. The inter-frequency neighboring cell list includes downlink neighboring information (dl-CarrierFreq). The downlink frequency information further includes uplink frequency information (ul-CarrierFreq) and D2D information (D2D Information). The downlink frequency information, the uplink frequency information, and D2D support information each can include multiple pieces of information (#0 to #n) in units of frequencies (or frequency bands).

Furthermore, the D2D information includes information indicating whether or not the D2D is supported with the uplink frequency (ul-CarrierFreq) and/or information indicating whether or not it is possible to change a frequency priority level of the downlink frequency (dl-CarrierFreq) in the cell reselection procedure. Each of these pieces of information may be indicated explicitly, and may be indicated implicitly.

For information indicating whether or not it is possible to change the frequency priority level of the downlink frequency (dl-CarrierFreq) in the cell reselection procedure, if such information is explicit, in a case where the change is approved, "Allowed" may be configured and notified, and in a case where the change is not approved, "Not-Allowed" may be configured and notified. Furthermore, if such information is implicit, in a case where the change is approved, "Allowed" may be configured, and in a case where the change is not approved, nothing may be notified.

The terminal device 1 can determine at least whether or not the D2D is supported with the uplink frequency (ul-CarrierFreq), based on the D2D information, in a cell in which the downlink frequency is constituted as dl-CarrierFreq and the uplink frequency as ul-CarrierFreq, and/or whether or not it is possible to change the frequency priority level of the downlink frequency (dl-CarrierFreq) in the cell reselection procedure.

FIG. 6 illustrates an example in which an uplink frequency neighboring cell list (UL-InterFreqNeighCellList) is notified to the terminal device 1. The uplink frequency neighboring cell list further includes the uplink frequency information (ul-CarrierFreq) and the D2D information (D2D Information). The uplink frequency information and D2D support information each can include multiple pieces of information (#0 to #n) in units of frequencies (or frequency bands).

The uplink frequency neighboring cell list corresponds to a downlink frequency neighboring cell list that is notified particularly to the terminal device 1. That is, the order of the downlink frequency (dl-CarrierFreq) that is listed as an entry in the downlink frequency neighboring cell list and the order of the uplink frequency (ul-CarrierFreq) that is listed as an entry in the uplink frequency neighboring cell list correspond to each other. For example, dl-CarrierFreq in the downlink frequency neighboring cell list #n corresponds (is linked) to ul-CarrierFreq #n in the uplink frequency neighboring cell list.

The terminal device 1 can determine at least whether or not the D2D is supported with the uplink frequency (ul-CarrierFreq), based on the D2D information, in the cell in which the downlink frequency is constituted as dl-CarrierFreq and the uplink frequency as ul-CarrierFreq, and/or whether or not it is possible to change the frequency priority level of the downlink frequency (dl-CarrierFreq) in the cell reselection procedure.

Moreover, in the case of a TDD band, the base station apparatus 2 may not include the uplink frequency information (ul-CarrierFreq). That is, in a case where a frequency that is included in the inter-frequency neighboring cell list is in an FDD band, the base station apparatus 2 includes the uplink frequency information (ul-CarrierFreq), in addition to the D2D information.

In this manner, based on information in the neighboring cell list, which is notified by the base station apparatus 2, in Step S202, the terminal device 1 determines whether or not the change of the priority level of the frequency in the cell reselection is approved.

In a case where it is determined that the change of the priority level of the frequency is approved (No in Step S202), the terminal device 1 determines that the transmission and reception of the D2D are impossible in a current serving cell. On the other hand, in a case where it is determined that the change of the priority level of the frequency is approved (Yes in Step S202), D2D cell selection processing is performed (Step S203).

In the D2D cell selection processing, the terminal device 1 regards a value of the priority level of the downlink frequency that corresponds to the uplink frequency at which the transmission and reception of the D2D is supported, as a value of the highest priority level, regardless of a value that is notified with the broadcast information. In more detail, the terminal device 1 regards a value (for example, 8) that is greater than values (0 to 7) of the frequency priority levels that are notified with the broadcast information, as the priority level of the frequency.

A description is provided using an example in FIG. 4. It is assumed that the frequency at which the terminal device 1 normally camps is in DL #0, and the frequency (D2D supported frequency) at which the transmission and reception of the D2D is supported (approved) is in UL #1. Furthermore, in the case where at the RF of the terminal device 1, only the first combination and the third combination are possible, it is determined that the D2D is difficult to transmit and receive in the state where the terminal device 1 itself normally camps on the cell in DL #0, but based on the D2D information from the base station apparatus 2, in a case where the change of the value of the priority level of the frequency in DL #1 that corresponds to UL #1 is approved, the terminal device 1 can regard the priority level of the frequency in DL #1 as the greatest value, and can start the cell reselection procedure.

Moreover, a special offset value for the cell selection relating to the D2D, which is applied only in a case where the cell at the frequency at which the D2D is supported is evaluated, may be notified by the base station apparatus 2 to the terminal device 1.

Figure 7:
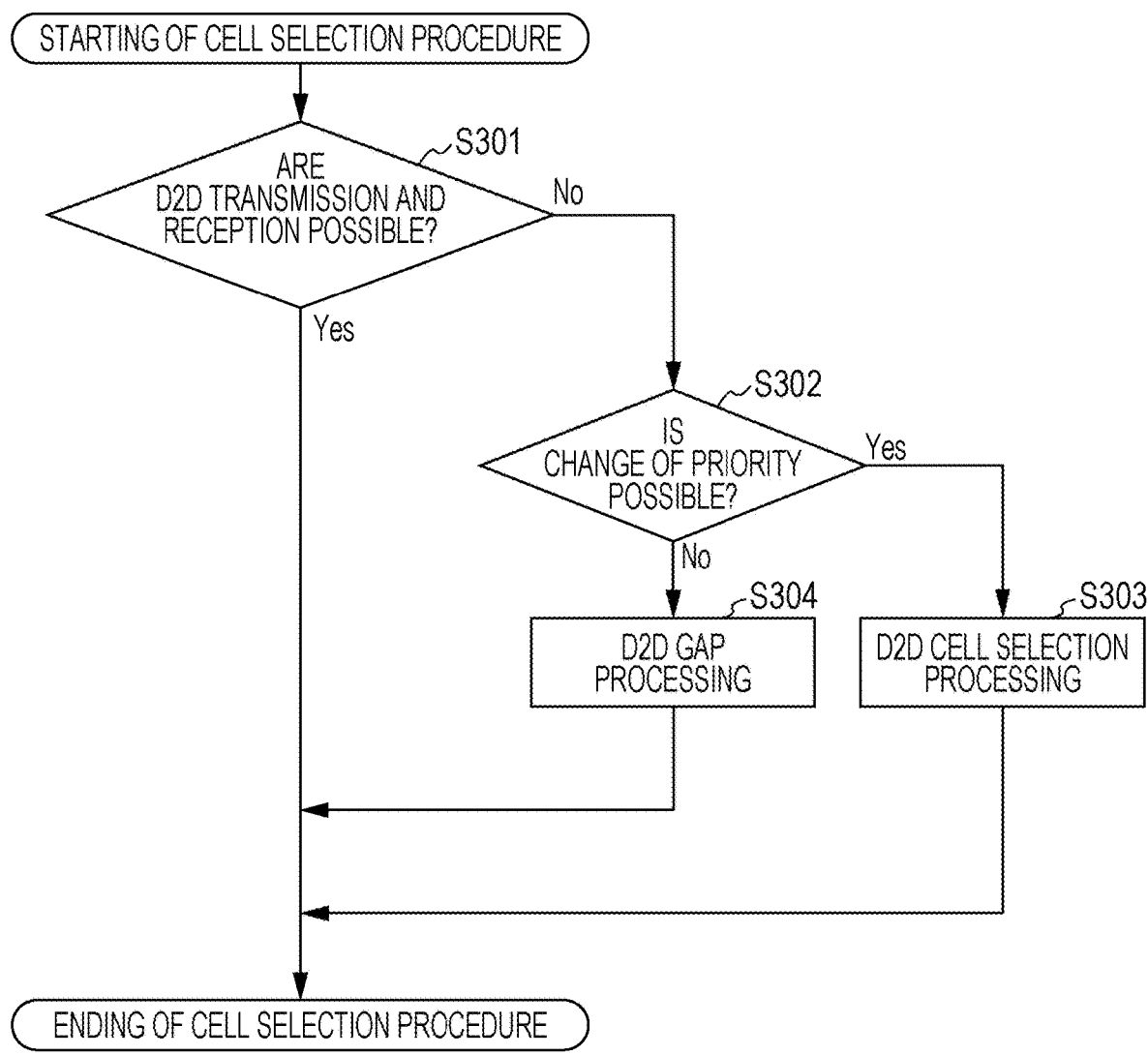
FIG. 7 is another example of the flowchart relating to the cell selection according to the first embodiment of the present invention.

FIG. 7 illustrates an example of a flowchart relating to the cell selection according to the first embodiment of the present invention.

In FIG. 7, when it comes to processing (determination) in Step S301, the terminal device 1 may perform the same processing as the one that determines whether or not it the transmission and reception of the D2D in Step S201 in FIG. 3 are possible. Furthermore, when it comes to processing (determination) in Step S302 in FIG. 7, the terminal device 1 may perform the same processing as the one that determines whether or not the change of the priority level of the frequency in the cell selection in Step S202 in FIG. 3. Furthermore, when it comes to processing (determination) in Step S303 in FIG. 7, the terminal device 1 may perform the same processing as the D2D cell selection processing in Step S203 in FIG. 3.

A difference with FIG. 3 is that in Step S302, as a result of determining whether or not the change of the priority level of the frequency is approved, in a case where it is determined that the change of the priority level of the frequency is not approved (No in Step S302), the terminal device 1 performs D2D gap processing (Step S304).

In the D2D gap processing, even in a case where the change of the priority level of the frequency (the frequency band) at which the D2D is supported is not approved, if the transmission and reception are possible at the frequency at which the D2D is supported, based on the combination of RFs that are handled by the terminal device 1, the terminal device 1 may generate a camp autonomously in the terminal device 1 itself and may attempt the transmission and reception of the D2D at the frequency.

A description is provided using the example in FIG. 4. The terminal device 1 supports the first combination and the third combination as the combinations of RFs that are handled. Furthermore, it is assumed that the change of the frequency in the cell reselection is not approved. It is assumed that the frequency at which the terminal device 1 normally camps is in DL #0, and the frequency (the D2D supported frequency) at which the transmission and reception of the D2D is supported (approved) is in UL #1.

The terminal device 1 uses the first combination as the combination of RFs. At this time, the terminal device 1 determines that the D2D is difficult to transmit and receive in a state where the terminal device 1 normally camps on the cell in DL #0 and switches an RF from frequency Band #0 to frequency band #1 at a timing (in a D2D gap or an idle gap) that is autonomously determined based on the D2D information on the neighboring cell. That is, in order to perform the transmission and reception of the D2D in UL #1, the terminal device 1 changes the combination of RFs from the first combination to the third combination.

Figure 8:
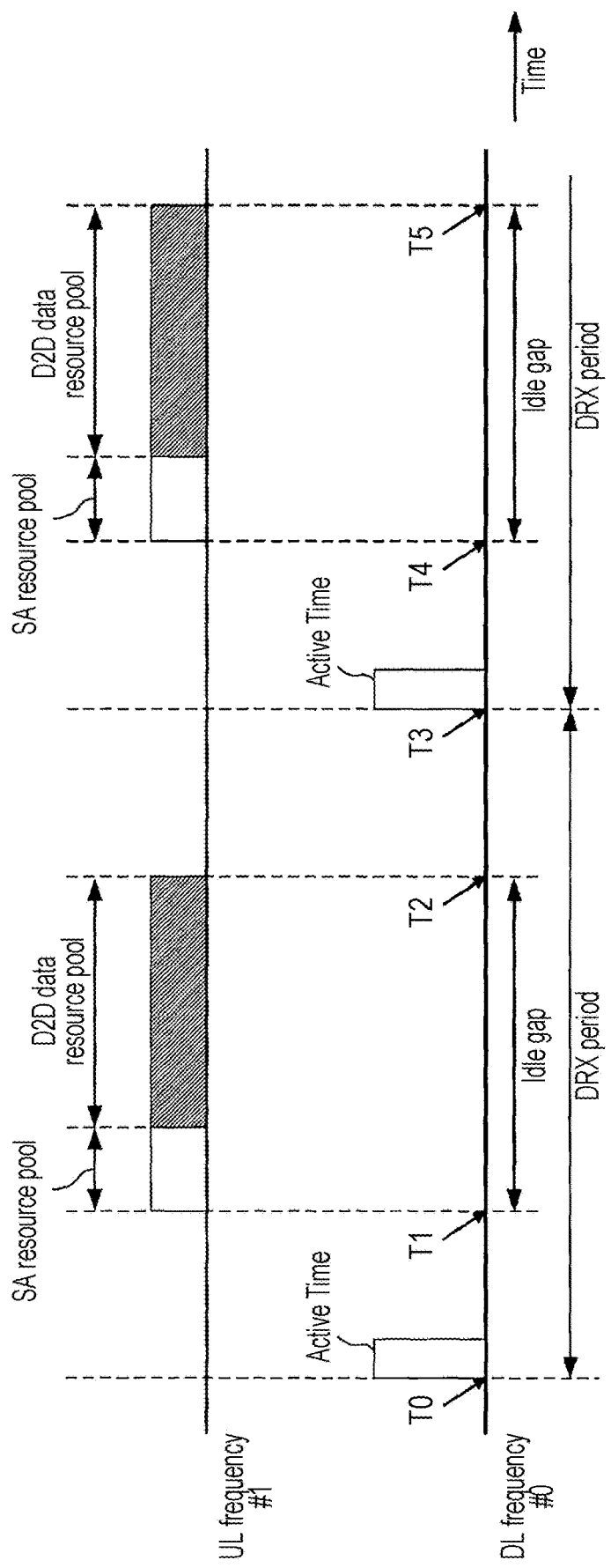
FIG. 8 is a diagram illustrating an example of a case where transmission and reception of a frequency at which D2D is supported are performed using an autonomous gap in the terminal device according to the first embodiment of the present invention.

FIG. 8 is a diagram illustrating that the terminal device 1 performs the transmission and reception of the frequency (the frequency band) at which the D2D is supported at the timing in an autonomous gap, starting from the frequency (the frequency band) at which the terminal device 1 camps normally. The horizontal axis in the drawing illustrates the elapsed time. The lower portion of the drawing illustrates operation of the terminal device 1 at the downlink frequency (DL frequency #0) in the cell on which the terminal device 1 normally camps. The upper portion of the drawing illustrates the operation of the terminal device 1 at the uplink frequency (UL frequency #1) at which the D2D is supported, which is different from the uplink frequency (UL frequency #0 (not illustrated)) in the cell on which the terminal device 1 normally camps.

The terminal device 1 is in the idle state and monitors the transmit signal (the PDCCH) from the base station apparatus 2, discontinuously at a paging reception interval (Paging Period).

In FIG. 8, in a common search space at time T0, terminal device 1 monitors the PDCCH over which CRC is masked with a Paging-Radio Network Temporary Identity (P-RNTI) and attempts to the reception of the paging. The reception of the paging is performed during the length of time during which the monitoring of the PDCCH that is referred to as Active Time is indispensable.

The terminal device 1 defines a period from when the Active Time expires to when the reception of the paging is next attempted (time T3), as a period during which the transmission and reception processing may not be performed on the cell on which the terminal device 1 camps, and determines that generation of an idle gap is possible. The terminal device 1 attempts the transmission and reception of the D2D in the uplink frequency (UL frequency #1), in a section (which is a period from time T1 to time T2 in the drawing) in which a resource pool for data transmission and reception of the SA and the D2D is configured.

More specifically, in the section for the idle gap, at the uplink frequency (UL frequency #1) at which the D2D is supported, the terminal device 1 receives and/or transmits the SA in the SA resource pool, and receives and/or transmits data relating to the D2D in the D2D data resource pool. Moreover, in a case where the terminal device 1 is interested only in the reception of the D2D, the terminal device 1 may perform only the reception processing relating to the D2D. In the same manner, in a case where the terminal device 1 is interested only in the transmission of the D2D, the terminal device 1 may perform only the transmission processing relating to the D2D.

The terminal device 1 autonomously determines a gap length of the idle gap. When it comes to the gap length of the idle gap, typically, the length in which each of the SA and the D2D data relating to the D2D in which the terminal device 1 is interested can be received, may be only guaranteed to the minimum extent.

The SA resource pool and the D2D data resource pool in the drawing include a resource pool for each of the transmission and the reception. The resource pool for the transmission the resource pool for the reception may be time-division-multiplexed and may be frequency-multiplexed. Furthermore, a set of the SA resource pool for the transmission and the D2D data resource pool for the transmission, and a set of the SA resource pool for the reception and the D2D data resource pool for the reception may be time-division-multiplexed, and may be frequency-multiplexed.

When it comes to processing at time T3 or later, while the terminal device 1 is interested in the D2D, processing at time T0 to time T3 may be reiterated until proceeding to the connected state takes place or until a different cell is selected with the cell reselection.

The condition in which the terminal device 1 that is capable of the D2D changes the value of the priority level of the frequency to the greatest value will be described below. That is, a triggering condition (a first condition) is described in which the terminal device 1 changes the value of the priority level of the frequency at which the D2D is supported from the value notified with the broadcast information to the greatest value in a case where the terminal device 1 is in a state where the D2D is difficult to transmit and receive, in the cell at the frequency at which the terminal device 1 camps.

The terminal device 1 may regard the triggering condition as being met (a subscription condition as being satisfied), for example, (1) when the terminal device 1 is authorized by a network or an external apparatus for the transmission and reception of the D2D, (2) when the terminal device 1 acquires information relating to the D2D from the broadcast information on the cell on which the terminal device 1 camps, (3) the start of the D2D is notified by the higher layer, such as a NAS layer or an application layer, (4) a service for the D2D that has a higher priority level than the D2D, execution of which is in progress, is started, and (5) when a PDCP entity and/or an RLC entity that corresponds to the D2D is established.

The terminal device 1 typically determines whether or the triggering condition is met before the D2D cell selection processing (Step S203 in FIG. 3 and Step S303 in FIG. 7), but may make a determination at any timing without being limited to this timing.

The terminal device 1 may categorize the start of the D2D that is the triggering condition, into the start of the reception of data relating to the D2D, and the start of the transmission of the data relating to the D2D. For example, the terminal device 1 may regard only the start of the reception of the data relating to the D2D as the triggering condition, and may not regard the start of the transmission of the data relating to the D2D as the triggering condition, and the contrary is possible.

The terminal device 1 may use each of these triggering conditions independently, and may combine multiple triggering conditions for use. Multiple triggering conditions may be possible. Furthermore, the base station apparatus 2 may notify every cell or every terminal device 1 which of the triggering conditions is used (or is not used), and which of the triggering conditions is used (or is not used) may be configured in advance. Moreover, triggering conditions other than these may be configured.

Moreover, the terminal device 1 may regard as a different triggering condition, or as a precondition relating to the change of the priority level of the frequency a case where the starting of the D2D in Mode 2 is indispensable, such as a case where the cell on which the terminal device 1 camps normally does not support the D2D, a case where it is notified with the broadcast information by the base station apparatus 2 that Mode 1 is not supported in the cell on which the terminal device 1 camps normally, a case where an RRC timer relating to an RRC connection rejection (RRC Connection Reject) in an RRC connection establishment procedure performs time-tracking, a case where the RRC timer relating to the limitation of the RRC connection establishment performs the time-tracking, a case where a dedicated priority level is already configured by the base station apparatus 2, or a case where the RRC timer relating to a radio resource control connection re-establishment (an RRC Connection Re-establishment) procedure performs the time-tracking.

On the other hand, in a case where the starting of the D2D in Mode 1 is approved, the terminal device 1 may start the D2D in Mode 1 instead of changing the value of the priority level of the frequency and making the cell reselection.

For example, in a case where the D2D is approved in the connected state in the base station apparatus 2, that is, in a case where the D2D in Mode 1 is approved in the cell on which the terminal device 1 itself camps normally, the terminal device 1 may change the value of the priority level of the related frequency and execute the cell reselection procedure, and may start the RRC connection establishment procedure in order to start the D2D in Mode 1. In a case where the D2D in Mode 1 is started for the terminal device 1, the base station apparatus 2 can move the terminal device 1 to the cell in which the transmission and reception of the D2D is supported, using the handover procedure.

The terminal device 1, when being a terminal device 1 that transmits the D2D, may start the RRC connection establishment procedure. The terminal device 1, when being a terminal device 1 that receives the D2D, may change the value of the priority level of the frequency. Furthermore, the terminal device 1, when not performing the transmission of the D2D, may change the value of the priority level of the frequency.

The condition in which the terminal device 1 that is capable of the D2D changes (restores) the value of the priority level of the frequency from the greatest value will be described below. That is, a triggering condition (a second condition) is described in which the terminal device 1 changes (deletes) the value of the priority level of the frequency and uses the value notified with the broadcast information in a state where the terminal device 1 is in a state where the value of the priority level of the frequency at which the D2D is supported is changed from the value notified with the broadcast information to the greatest value.

The terminal device 1 may regard the triggering condition as not being met (a disconnection as being satisfied), for example, (1) when there is no interest in the D2D, (2) when the proceeding to the connected state takes place, (3) when with the cell reselection, a different cell is selected, (4) the service for the D2D that has a higher priority level than the D2D that is in progress, (5) the PDCP entity and/or the RLC entity that corresponds to the D2D is released, and (6) when with the dedicated RRC message, a different priority level is configured for a certain frequency.

It may be notified by the higher layer, such as the NAS layer or the application layer, that the terminal device 1 is not interested in the D2D. In a case where a certain time elapses from when the transmission and reception of the D2D is ended, the terminal device 1 may be regarded as not being interested in the D2D.

Furthermore, the terminal device 1 may determine that the proceeding to the connected state takes place at a timing at which the RRC connection establishment procedure is started or at a timing at which a timer (T300) relating to the RRC connection establishment procedure is started.

Moreover, when with the dedicated RRC message, a different priority level is configured (notified) for a certain frequency, the terminal device 1 may disregard values of all priority levels that are notified with the neighboring cell information, which include frequencies other than the frequency for which the priority level is configured with the RRC message, at which the D2D is supported.

The terminal device 1 may use each of these triggering conditions independently, and may combine multiple triggering conditions for use. Multiple triggering conditions may be possible. Furthermore, the base station apparatus 2 may notify every cell or every terminal device 1 which of the triggering conditions is used or is not used, and which of the triggering conditions is used or is not used may be configured in advance. Moreover, triggering conditions other than these may be configured.

With this constitution, in the case where the terminal device 1 is interested in the D2D, based on the combination (RF Capability) of RFs that are built into terminal device 1 itself, the frequency at (the frequency band in) which the D2D is supported, and the frequency at (the frequency band in) which terminal device 1 itself camps, the terminal device 1 can determine whether or not the transmission and reception are possible at the frequency at which the D2D is supported. Furthermore, in a case where the transmission and reception are not possible at the frequency at which the D2D is supported, based on the D2D information that is notified by the base station apparatus 2, the terminal device 1 can make the cell reselection procedure in which the priority level of the frequency at which the D2D is supported is changed.

Furthermore, in the case where the transmission and reception are not possible at the frequency at which the D2D is supported, based on the neighboring cell information (the D2D information) that is notified by the base station apparatus 2, the terminal device 1 can perform the transmission and reception at the frequency at which the D2D is supported, using the autonomous gap. Furthermore, by notifying the neighboring cell information, the base station apparatus 2 can notify the terminal device 1 of approval of the cell reselection procedure in which the priority level of the frequency at which the D2D is supported is changed.

According to the first embodiment, in the case where the terminal device 1 is interested in the D2D, as a communication method relating to the D2D, based on the neighboring cell information (the D2D information) from the base station apparatus 2, by changing the priority level of the frequency at which the D2D is supported, the terminal device 1 can efficiently execute communication corresponding to the D2D and a communication procedure associated with the D2D because the terminal device 1 can suitably camp on the cell at the frequency at which it is possible that the service for the D2D is provided. Furthermore, based on frequency capacities of the base station apparatus 2 itself and/or the neighboring cell, by notifying the terminal device 1 of the approval or disapproval of the cell reselection procedure in which the priority level of the frequency at which the D2D is supported is changed, the base station apparatus 2 can efficiently perform each of the communication corresponding to the D2D and the communication procedure associated with the D2D because a Load Balance between frequencies can be adjusted.

Second Embodiment

A second embodiment of the present invention will be described below.

According to the first embodiment, a cell reselection method is described in which in a case where the frequency at which the D2D is supported in the cell on which the terminal device 1 camps normally is difficult to transmit and receive, the priority level of the frequency is configured to be higher than those of other frequencies.

According to the second embodiment, a cell reselection method is described in which even in a case where the frequency at which the D2D is supported in the cell on which the terminal device 1 camps normally can be transmitted and received, the priority level of the frequency is configured to be higher than those of other frequencies.

Because constitutions of the terminal device 1 and the base station apparatus 2 according to the second embodiment are the same as those in the first embodiment, descriptions thereof are omitted. A triggering condition that is used in the second embodiment may be the same as that in the first embodiment.

The second embodiment is described using the example in FIG. 4. The terminal device 1 supports all of the first combination, the second combination, and the third combination, as the combinations of RFs that are handled. It is assumed that the frequency at which the terminal device 1 normally camps is in DL #0, and the frequency (the D2D supported frequency) at which the transmission and reception of the D2D are supported (approved) is in UL #1. The base station apparatus 2 notifies the terminal device 1 of the inter-frequency neighboring cell list (InterFreqNeighCellList) indicating the frequency at which at least the transmission and reception of the D2D is supported (approved).

At this time, by acquiring information on the frequency at which the transmission and reception of the D2D is supported, in the inter-frequency neighboring cell list, from the base station apparatus 2, the terminal device 1 can determine that the transmission and reception of the D2D are performed in UL #1 while monitoring the downlink in the cell in DL #0, using the second combination, and/or can determine that the transmission and reception of the D2D is performed in UL #1 while monitoring the downlink in the cell in DL #1, using the third combination. In this case, the terminal device 1 regards both of the priority levels of the frequencies in DL #0 and DL #1 as the highest values, and starts the cell reselection procedure.

In other words, in a case where multiple combinations of RFs that correspond to the uplink frequency at which the terminal device 1 supports the transmission and reception of the D2D are present, the terminal device 1 may regard the priority level of the frequency that corresponds to the multiple combinations of RFs, as the highest value, and may execute the cell reselection procedure.

Moreover, in a case where the D2D is difficult to transmit and receive without changing the downlink frequency in the cell on which the terminal device 1 camps normally, by the using any method that is described according to the first embodiment, the terminal device 1 can execute the cell reselection procedure in which the priority level of the frequency at which the D2D is supported.

With this constitution, in the case where terminal device 1 is interested in the D2D, based on the combination (the RF Capability) of RFs that is built into terminal device 1 itself and the frequency at (the frequency band in) which the D2D is supported, terminal device 1 can determine whether or not the transmission and reception at the frequency at which the D2D is supported is possible. In a case where the transmission and reception at the frequency at which the D2D is supported are possible, the terminal device 1 can execute the cell reselection procedure in which the priority level of the corresponding frequency, in all combinations of RFs at which the transmission and reception are possible.

Furthermore, by notifying the neighboring cell information (the D2D information) on the neighboring cell, the base station apparatus 2 can notify the terminal device 1 of the approval of the cell reselection procedure in which the priority level of the frequency corresponding to the combination of RFs.

According to the second embodiment, in the case where the terminal device 1 is interested in the D2D, as the communication method relating to the D2D, based on the neighboring cell information (the D2D information) from the base station apparatus 2, by changing priority levels of all frequencies that correspond to the combination of RFs in the terminal device 1 itself, the terminal device 1 can efficiently perform the communication corresponding to the D2D and execute a communication procedure associated with the D2D because the terminal device 1 can suitably camp on the cell at the frequency at which it is possible that the service for the D2D is provided. Furthermore, based on the frequency capacities of the base station apparatus 2 itself and/or the neighboring cell, by notifying the terminal device 1 of the approval or disapproval of the cell reselection procedure in which the priority level of the corresponding frequency is changed, the base station apparatus 2 can efficiently perform each of the communication corresponding to the D2D and the communication procedure associated with the D2D because the Load Balance between frequencies can be adjusted.

Moreover, the embodiments described above are only simple examples, and can be realized using various modification examples and substitution examples. For example, it is possible that an uplink transmission scheme is also applied to a communication system in compliance with either a frequency division duplex (FDD) scheme or a time division duplex (TDD) scheme. Furthermore, because the name of each parameter or each event that is described according to the embodiments is given for convenience of description, even if the name that is applied in practice and the name according to the embodiments of the present invention are different from each other, this does not exert any influence on the gist of the invention claimed, in the embodiments of the present invention.

Furthermore, the term "connection" that is used in each embodiment is not limited only to the constitution in which a certain device or apparatus and a different certain device or apparatus are connected directly to each other using a physical circuit, and includes the meaning of a constitution in which a connection is made logically or of a constitution in which a wireless connection is made using a wireless technology.

Furthermore, the terminal devices 1 include not only a portable or moving mobile station apparatus, but also a stationary-type electronic apparatus that is installed indoors or outdoors, or a non-moving-type electronic apparatus, for example, an AV apparatus, a kitchen apparatus, a cleaning and washing machine, an air conditioner, office equipment, a vending machine, other household apparatuses or measuring apparatuses, a vehicle-mounted apparatus, and a device that results from building a communication function into a wearable device or a health care device that is capable of being worn on a human body. Furthermore, the terminal device 1 is used not only for human-to-human or human-to-machine communication, but also for a machine-to-machine communication (Machine Type Communication).

The terminal device 1 is also referred to as a user terminal, a mobile station apparatus, a communication terminal, a mobile machine, a terminal, a User Equipment (UE), or a Mobile Station (MS). The base station apparatus 2 is also referred to as a wireless base station apparatus, a base station, a wireless base station, a fixed station, a NodeB (NB), an evolved Node B (eNB), a Base Transceiver Station (BTS), or a Base Station (BS).

Moreover, the base station apparatus 2 is referred to as the NB in UMTS that is stipulated by 3GPP, and as the eNB in EUTRA. Moreover, the terminal device 1 in UMTS that is stipulated by 3GPP and in EUTRA is referred to as the UE.

Furthermore, for convenience of description, the method, the means, and the algorithm step of realizing the functions of, some of the functions, of the units of each of the terminal device 1 and the base station apparatus 2 are described in specific combinations referring to the functional block diagrams, but these can be realized directly by a piece of software, a software module that is implemented by a processor, or combinations of these.

If the method, the means, and the algorithm step are built in hardware, in addition to being constituted as described referring to the block diagrams, the terminal device 1 and the base station apparatus 2 each are constituted from a power supply device or battery that supplies power to the terminal device 1 and the base station apparatus 2, a display device such as a liquid crystal display, a display drive device, a memory, an input and output interface, input and output terminals, a speaker, and other peripheral devices.

If the method, the means, and the algorithm step are built in software, the function can be retained as one or more commands or codes on a computer-readable medium, and can be transmitted. The computer-readable media include both of communication media or computer-recordable media that help to carry a computer program from one place to another place.

Then, one or more commands or codes may be recorded on the computer-readable recording medium, and a computer system may be caused to read and execute the one or more command or codes that are recorded on the recording medium to perform control of the terminal device 1 or the base station apparatus 2. Moreover, the "computer system" here is defined as including an OS and hardware components such as a peripheral device.

The operations that are described according to each embodiment of the present invention may be realized with a program. A program running on the terminal device 1 and the base station apparatus 2 according to each embodiment of the present invention is a program (a program for causing a computer to operate) that controls a CPU and the like in such a manner as to realize the above-described functions of each embodiment according to each embodiment of the present invention. Then, pieces of information that are handled in the apparatus and the device are temporarily stored in a RAM while being processed. Thereafter, the pieces of information are stored in various ROMs or HDDs, and if need arises, is read by the CPU to be modified or written.

Furthermore, in some cases, the functions of the embodiments described above are realized by executing the program, and in addition, the functions of each embodiment of the present invention are realized by performing processing in conjunction with an operating system or other application programs, based on an instruction from the program.

Furthermore, the "computer-readable recording medium" refers to a portable medium, such as a semiconductor medium (for example, a RAM, a nonvolatile memory card, or the like), an optical recording medium (for example, a DVD, an MO, an MD, a CD, a BD, or the like), and a magnetic recording medium (for example, a magnetic tape, a flexible disk, or the like), and a recording device, such as a disk unit that is built into the computer system. Moreover, the "computer-readable recording media" is defined as including a medium that dynamically retains the program for a short period of time, such as a communication line that is available when transmitting the program over a network such as the Internet or over a communication line such as a telephone line, and a medium that retains the program for a fixed period of time, such as a volatile memory within the computer system, which functions as a server or a client in a case where the program is retained dynamically for a short period of time.

Furthermore, the above-described program may be one for realizing some of the above-described functions and additionally may be one that can realize the above-described functions in combination with a program that is already recorded in the computer system.

Furthermore, functional blocks or all features of each of the terminal device 1 and the base station apparatus 2 according to each embodiment described above can be built into or implemented by a general-purpose processor, a digital signal processor (DSP), an application-specific integrated circuit (ASIC) or a general-purpose arbitrary integrated circuit (IC), a field programmable gate-array signal (FPGA) or a different type of programmable logic device, a discrete gate or a transistor logic, a discrete hardware component, or a combination of these.

The general-purpose processor may be a microprocessor, and instead, the processor may be a conventional processor, a controller, a microcontroller, or a state machine. The general-purpose processor or each circuit described above may be constituted as a digital circuit, and may be constituted as an analog circuit.

Furthermore, the processor may be built as a combination of computing devices. For example, the processor may be a DSP and a microprocessor, multiple microprocessors, one or more microprocessors that are connected to a DSP core, or a combination of other such constitutions.

The embodiments of the invention are described in detail above based on the specific examples, but it is apparent that the nature of each of the embodiments of the present invention and the scope of claims are not limited to the specific examples. A change in design and the like that fall within the scope that does not depart from the gist of the invention are also included. That is, the description in the present specification serves the purpose of providing an exemplary description, and does not impose any limitation to each embodiment of the present invention.

Furthermore, various modifications are possible within the scope of the present invention defined by claims, and embodiments that are implemented by suitably combining technical means that are disclosed according to different embodiments also fall within the technical scope of the present invention. Furthermore, a configuration in which a constituent element that achieves the same effect is substituted for the one that is described according to each embodiment described above is also included in the technical scope of the present invention.

INDUSTRIAL APPLICABILITY

The present invention is usable in the fields of a communication apparatus including a terminal device and a base station apparatus, and of other electronic apparatuses.

DESCRIPTION OF REFERENCE NUMERALS

1 TERMINAL DEVICE
2 BASE STATION APPARATUS
101, 201 RECEPTION UNIT
102, 202 DEMODULATION UNIT
103, 203 DECODING UNIT
104, 204 RECEPTION DATA CONTROL UNIT
105, 205 PHYSICAL LAYER CONTROL UNIT
106, 206 TRANSMISSION DATA CONTROL UNIT
107, 207 CODING UNIT
108, 208 MODULATION UNIT
109, 209 TRANSMISSION UNIT
110, 210 RADIO RESOURCE CONTROL UNIT
111 CELL SELECTION UNIT
211 NETWORK SIGNAL TRANSMISSION AND RECEPTION UNIT

The invention claimed is:

1. A first terminal device that is capable of direct communication with a second terminal device different from the first terminal device, the first terminal device comprising:
reception circuitry that receives first system information including cell selection parameters and second system information indicating a radio resource for the direct communication, the cell selection parameters including an offset for cell selection relating to the direct communication, the offset being used for an evaluation of a cell on a frequency which supports the direct communication, and the frequency being a non-serving frequency; and cell selection circuitry that determines that the first terminal device is configured to perform the direct communication on the frequency using the radio resource for the direct communication, in a case that at least one neighboring cell is detected on the frequency by the evaluation, wherein the cell selection circuitry performs the evaluation based on the cell selection parameters and a result of a measurement for the neighboring cell.

2. The first terminal device according to claim 1, wherein the cell selection circuitry, in a case that the neighboring cell in which the direct communication at the frequency is performed has been selected, performs evaluation for reselecting a neighboring cell for the cell in which the direct communication is performed.

3. A communication method of a first terminal device that is capable of direct communication with a second terminal device different from the first terminal device, the communication method comprising:

receiving first system information including cell selection parameters and second system information indicating a radio resource for the direct communication, the cell selection parameters including an offset for cell selection relating to the direct communication, the offset being used for an evaluation of a cell on a frequency which supports the direct communication, and the frequency being a non-serving frequency; and in a case that at least one neighboring cell is detected on the frequency by the evaluation, performing measurement for a neighboring cell;

performing the evaluation for the cell selection based on the cell selection parameters and a result of the measurement; and determining that the first terminal device is configured to perform the direct communication on the frequency using the direct communication resources.

4. The communication method according to claim 3, further comprising:

performing evaluation for reselecting a neighboring cell for the cell in which the direct communication is performed in a case that the neighboring cell in which the direct communication at the frequency is performed has been selected.

5. An integrated circuit that is built into a first terminal device that is capable of direct communication with a second terminal device different from the first terminal device, the integrated circuit causing the first terminal device to perform at least:

receiving first system information including cell selection parameters and second system information indicating a radio resource for the direct communication, the cell selection parameters including an offset for cell selection relating to the direct communication, the offset being used for an evaluation of a cell on a frequency which supports the direct communication, and the frequency being a non-serving frequency; and in a case that at least one neighboring cell is detected on the frequency by the evaluation, performing measurement for a neighboring cell;

performing the evaluation for the cell selection based on the cell selection parameters and a result of the measurement; and determining that the first terminal device is configured to perform the direct communication on the frequency using the direct communication resources.

* * * * *